(12) United States Patent
Carus et al.

(10) Patent No.: US 8,131,756 B2
(45) Date of Patent: Mar. 6, 2012

(54) APPARATUS, SYSTEM AND METHOD FOR DEVELOPING TOOLS TO PROCESS NATURAL LANGUAGE TEXT

(76) Inventors: Alwin B. Carus, Waban, MA (US); Thomas J. DePlonty, Melrose, MA (US)

(*) Notice: Subject to any disclaimer, the term of this patent is extended or adjusted under 35 U.S.C. 154(b) by 573 days.

(21) Appl. No.: 12/304,048

(22) PCT Filed: Jun. 5, 2007

(86) PCT No.: PCT/US2007/013237
§ 371 (c)(1),
(2), (4) Date: Dec. 9, 2008

(87) PCT Pub. No.: WO2007/149216
PCT Pub. Date: Dec. 27, 2007

(65) Prior Publication Data
US 2010/0293451 A1    Nov. 18, 2010

Related U.S. Application Data

(60) Provisional application No. 60/815,431, filed on Jun. 21, 2006.

(51) Int. Cl.
*G06F 17/30* (2006.01)
(52) U.S. Cl. ..................................................... 707/776

(58) Field of Classification Search .................. 707/776
See application file for complete search history.

(56) References Cited

U.S. PATENT DOCUMENTS

| 7,366,715 B2* | 4/2008 | Liu et al. ............................... 1/1 |
| 7,769,701 B2* | 8/2010 | Carus et al. ...................... 706/12 |
| 2006/0009966 A1* | 1/2006 | Johnson et al. ................. 704/10 |
| 2006/0253274 A1* | 11/2006 | Miller ............................... 704/9 |

* cited by examiner

*Primary Examiner* — Cheryl Lewis
(74) *Attorney, Agent, or Firm* — The Law Offices of Anthony L. Meola

(57) ABSTRACT

The disclosed invention includes an apparatus, system and method for developing tools to explore, organize, structure, extract, and mine natural language text. The system contains three sub-systems: a run-time engine, a development environment, and a feedback system. The invention also includes a system and method for improving the quality of information extraction applications consisting of an ensemble of per-user, adaptive, on-line machine-learning classifiers that adapt to document content and judgments of users by continuously incorporating feedback from information extraction results and corrections that users apply to these results. At least one of the machine-learning classifier also provides explanations or justifications for classification decisions in the form of rules; other machine-learning classifiers may provide feedback in the form of supporting instances or patterns.

23 Claims, 13 Drawing Sheets

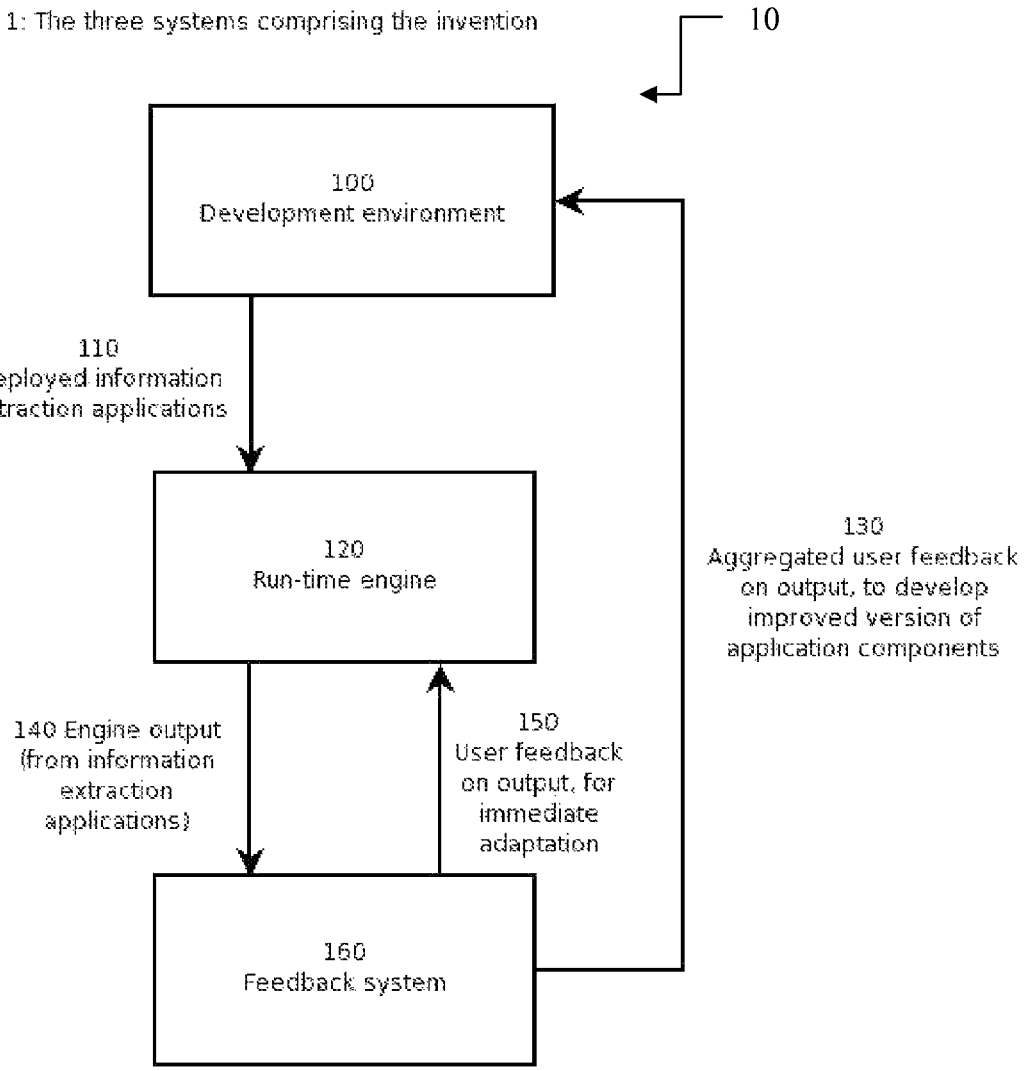
FIGURE 1: The three systems comprising the invention

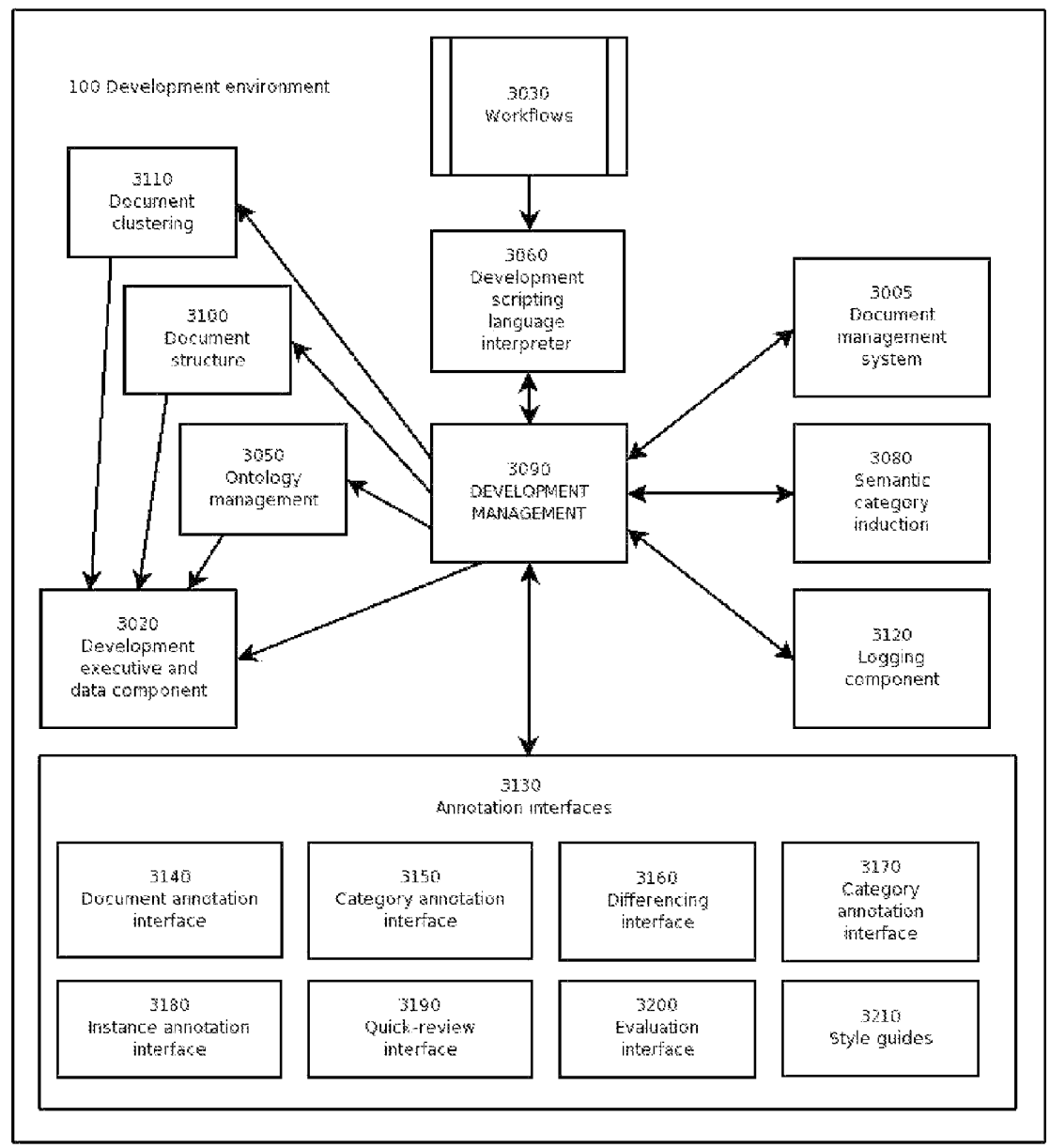

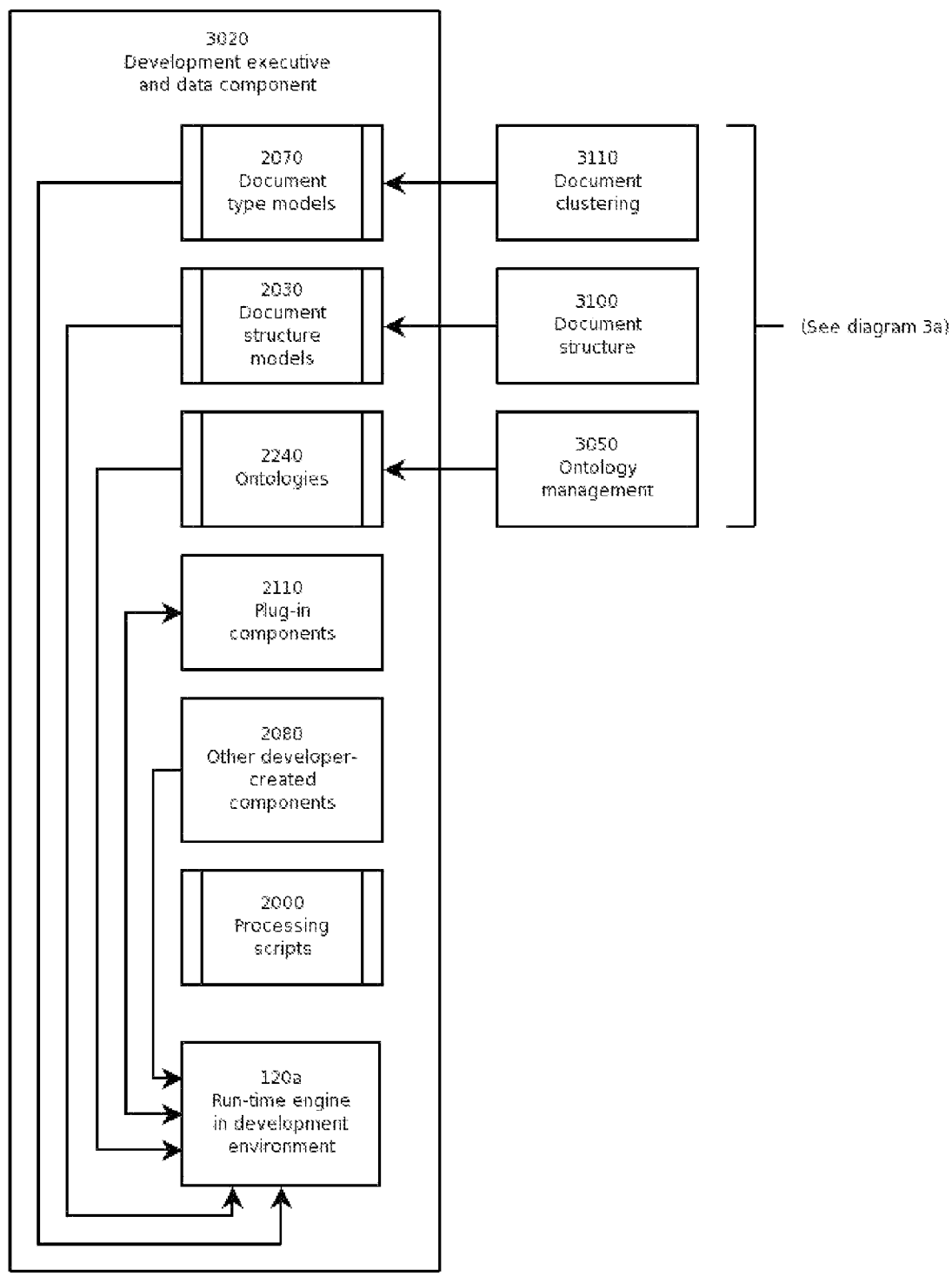

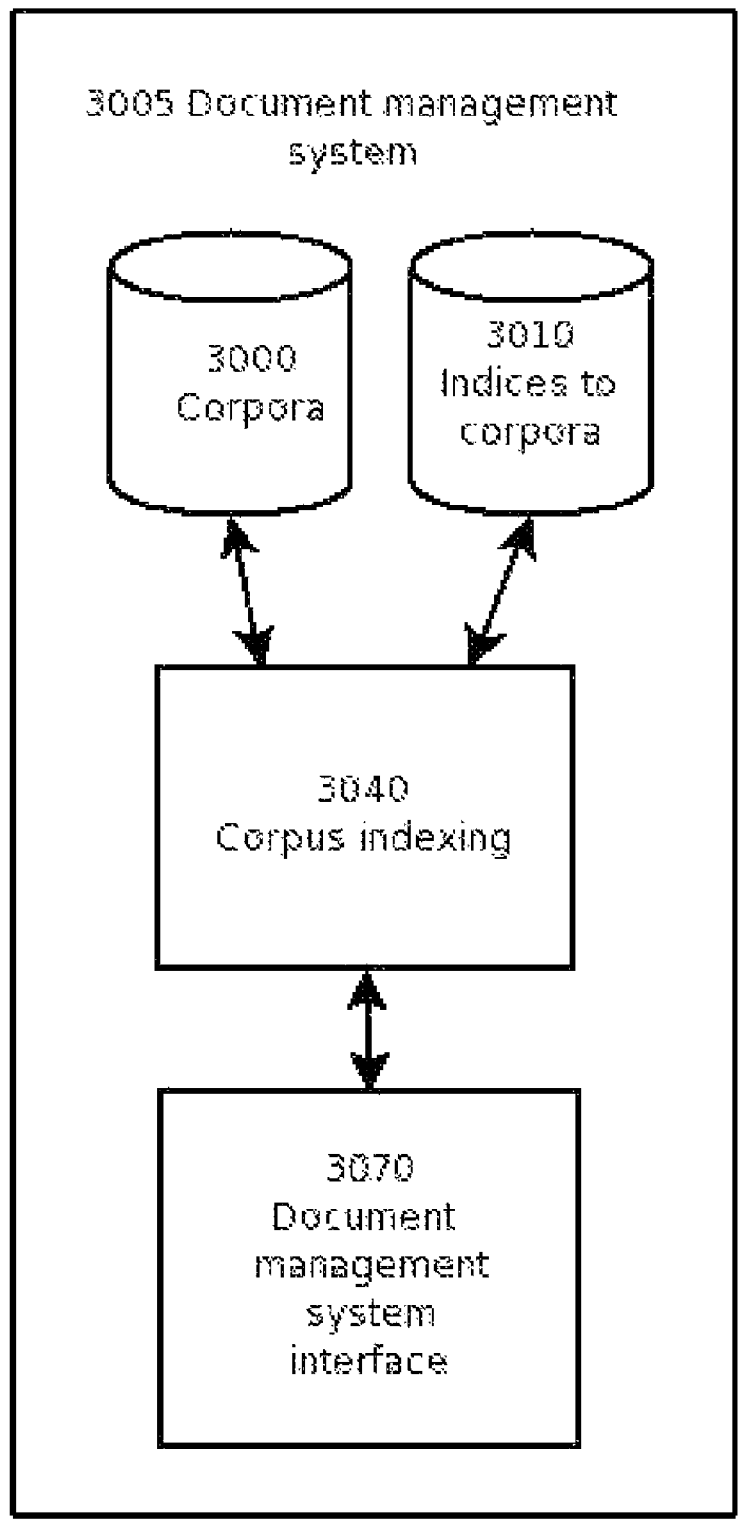
FIGURE 3c: Document management system (detail)

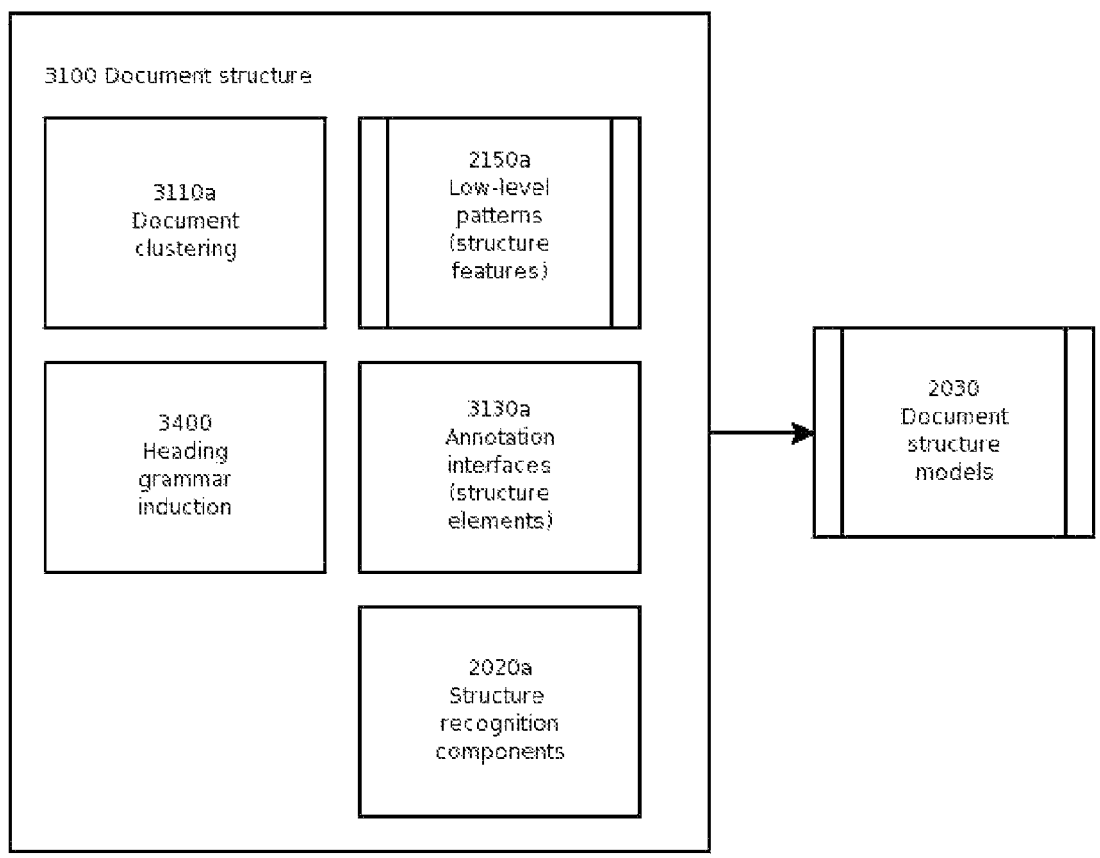

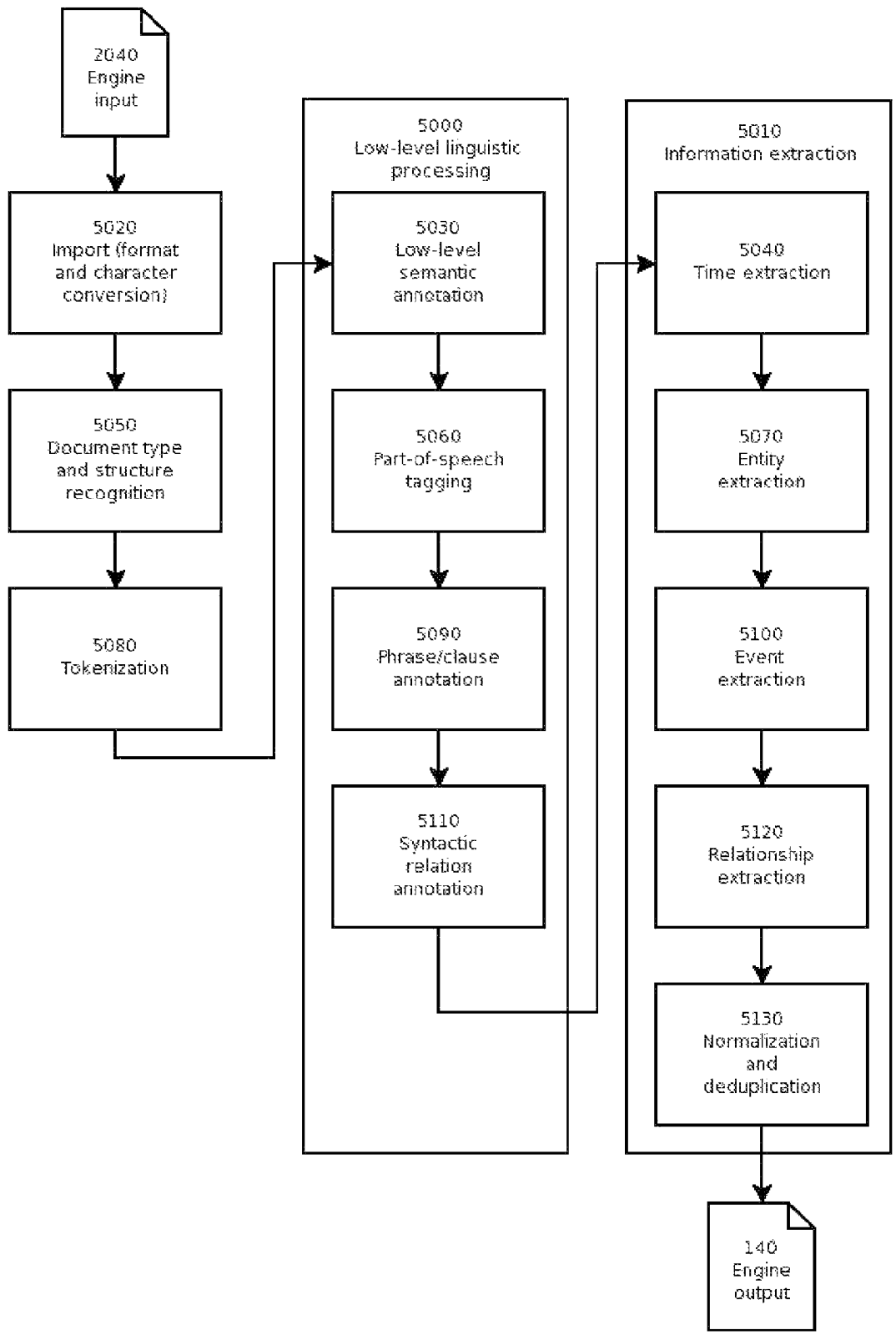
FIGURE 5: Process diagram: processing flow of a typical information extraction application

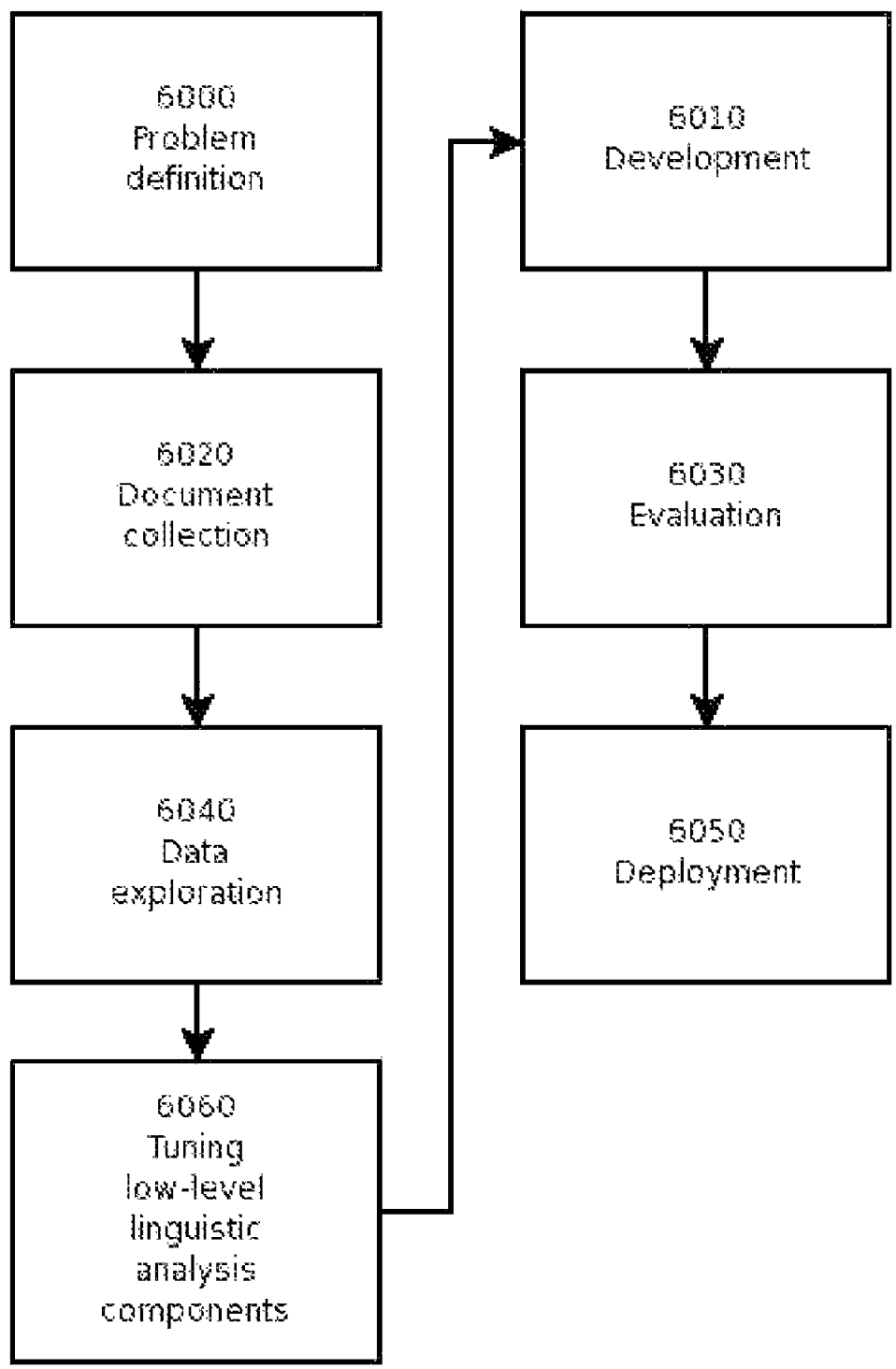
FIGURE 6a: Process diagram: typical flow of information extraction application development

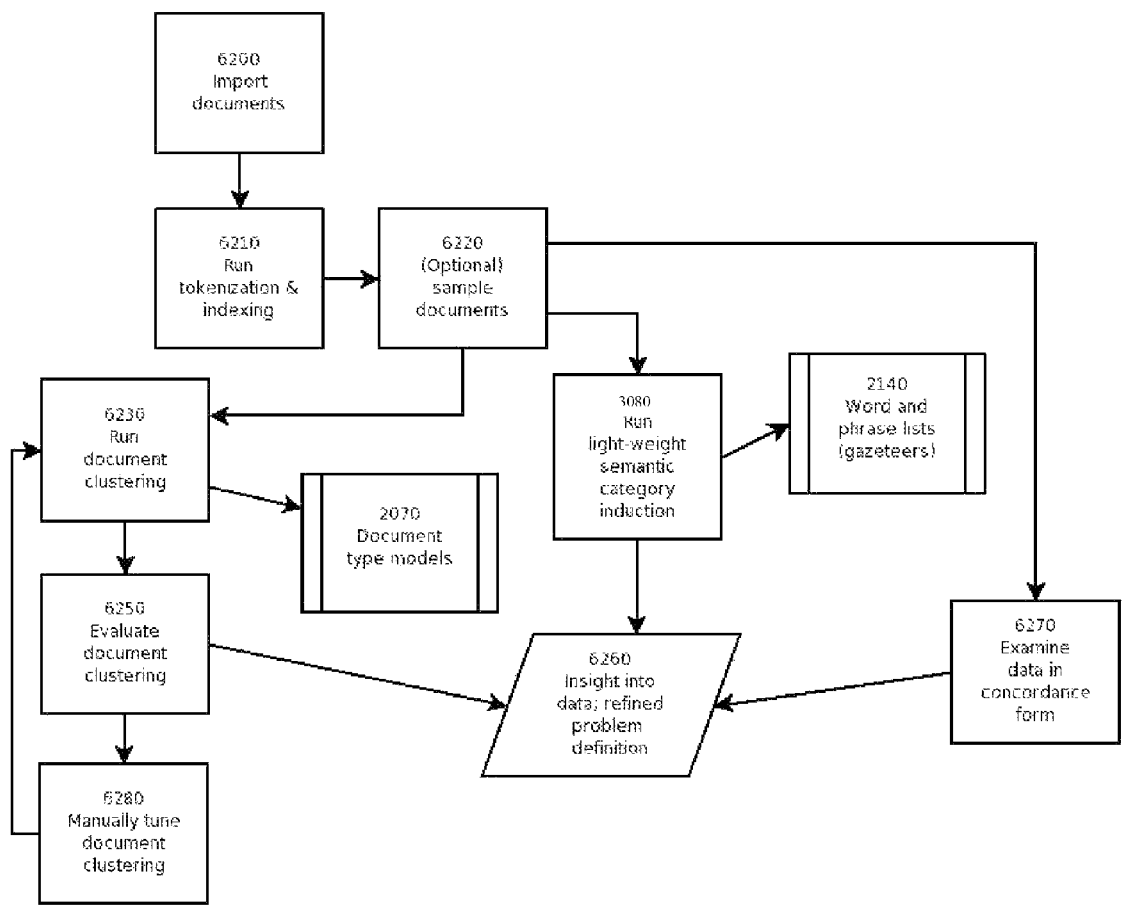

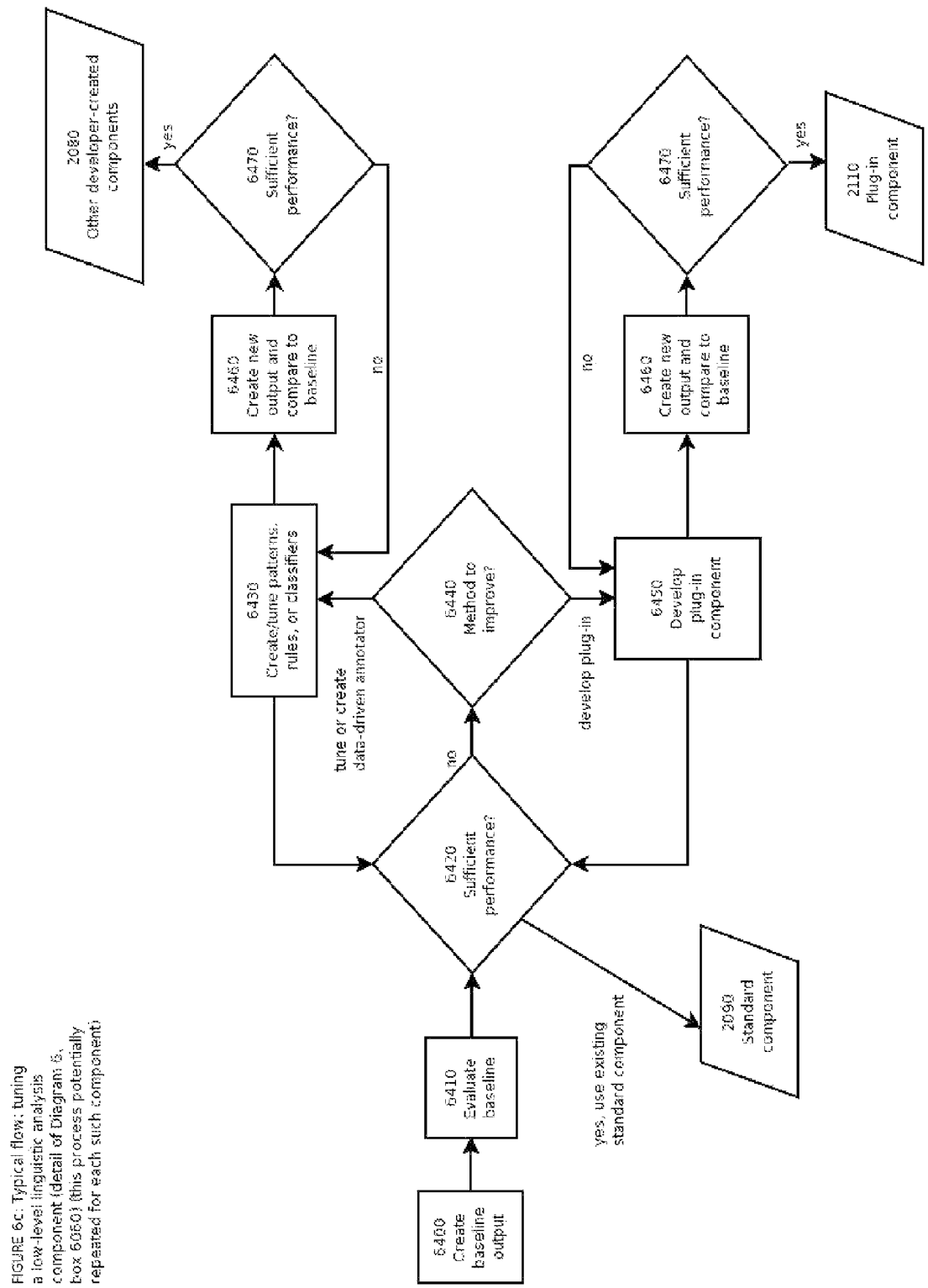
FIGURE 6c: Typical flow: tuning a low-level linguistic analysis component (detail of Diagram 6, box 6060) (this process potentially repeated for each such component)

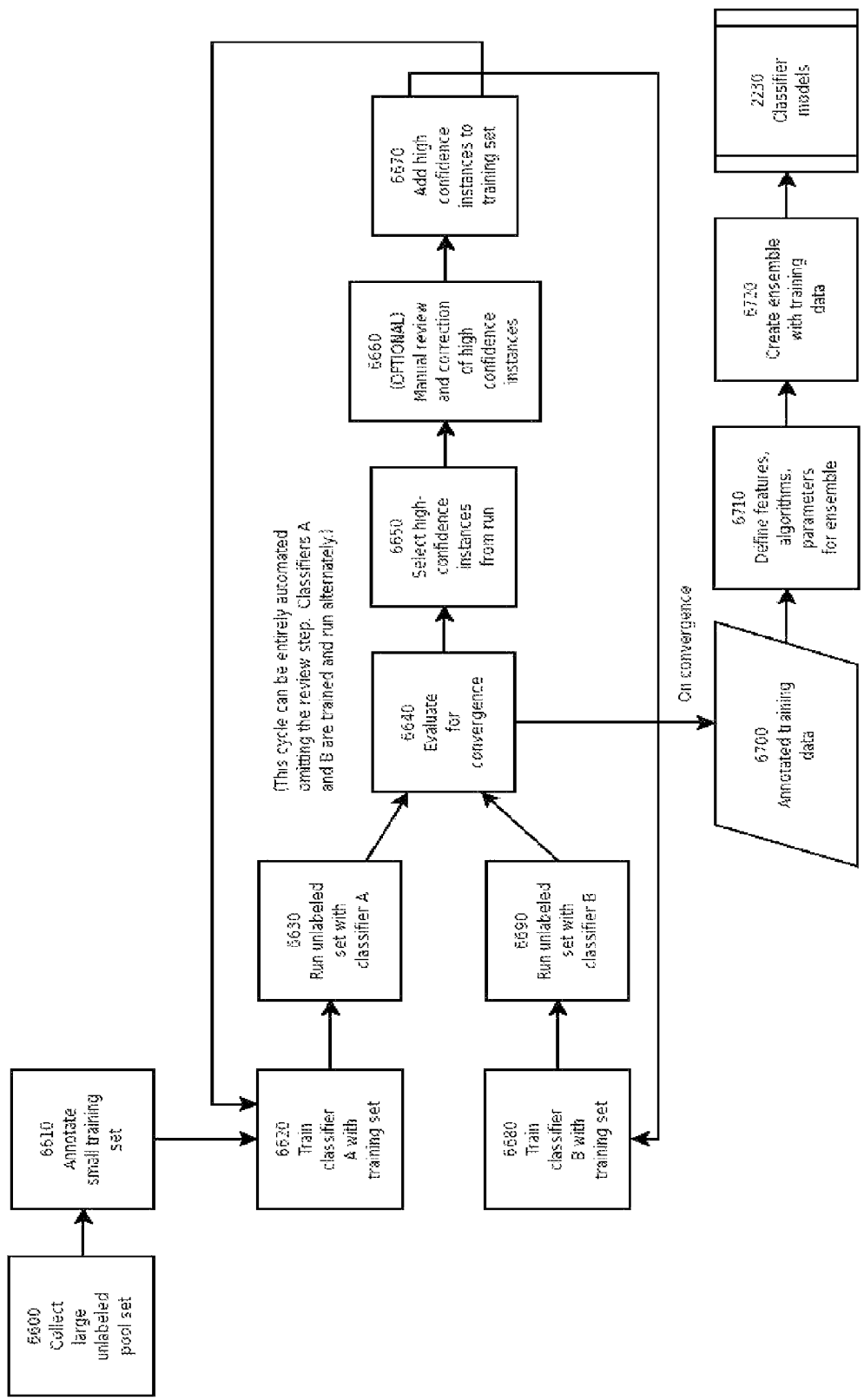
FIGURE 6d: Typical learning workflow to create classifier ensemble (2-classifier co-training with optional active learning) (detail of diagram 6b, box 6420)

APPARATUS, SYSTEM AND METHOD FOR DEVELOPING TOOLS TO PROCESS NATURAL LANGUAGE TEXT

CROSS REFERENCE TO RELATED APPLICATIONS

The present application is a U.S. National Stage Application under 35 U.S.C. Section 371 based upon co-pending International Application No. PCT/US2007/013237, with an International Filing date of May 6, 2007, entitled, "AN APPARATUS, SYSTEM AND METHOD FOR DEVELOPING TOOLS TO PROCESS NATURAL LANGUAGE TEX", which International Application takes priority from expired U.S. provisional application Ser. No. 60/815,431, filed on Jun. 21, 2006 and entitled "AN APPARATUS, SYSTEM AND METHOD FOR DEVELOPING TOOLS TO PROCESS NATURAL LANGUAGE TEXT."

The present application also relates to co-invented and co-owned U.S. non-provisional patent application Ser. No. 11/820,677, now U.S. Pat. No. 7,558,778, filed on Jun. 21, 2007 and entitled "SEMANTIC EXPLORATION AND DISCOVERY"; and also relates to co-invented and co-owned U.S. non-provisional patent application Ser. No. 11/821,060, now U.S. Pat. No. 7,769,701, filed on Jun. 21, 2007 and entitled "SATELLITE CLASSIFIER ENSEMBLE", both of which applications are hereby incorporated by reference in their respective entireties.

BACKGROUND OF THE INVENTION

1. The Field of the Present Invention

The present invention relates generally to an apparatus, system and method for the creation of a fully configurable, customizable, adaptive, and scriptable natural language processing software application development system. The invention consists of document management, semantic exploration, application development and deployment, and application feedback systems, each with task-specific graphical interfaces.

2. General Background

Information extraction (IE) applications are natural language processing (NLP) systems used on their own or coupled with information retrieval, text analytics, and text mining systems to identify, normalize, and remove duplicate information elements found in documents. IE applications are used to discover and organize the latent meaningful and fine-grained content elements of documents. These content elements include such information "entities" as persons, places, times, objects, events, and relationships among them. For example, an IE task in finance and business might consist of processing business articles and press releases to identify, normalize, and relate the names of companies, stock ticker symbols, employees and corporate officers, times, and events such as mergers and acquisitions. These information elements are thereby made suitable for storage and retrieval by database and information retrieval systems. In the finance and business example, these data might be used to alert investors, bankers, and brokers of significant business transactions or to assist in the detection of business fraud or insider trading.

IE is related to but distinct from information retrieval (IR). IR is concerned with searching and retrieving documents or document passages that provide information that is relevant to a user's query, usually supplied in natural language as a few terms. Document clustering and classification are related NLP techniques that can provide other types of high-level document search or navigation aids. They complement IR by organizing documents or sections of documents into meaningfully related groups and sub-groups based on content. Another related NLP technology is document summarization, which attempts to find a small number of passages in one or more documents that characterize their content succinctly. Still another related NLP technology is question answering, which attempts to find passages in documents or construct answers from documents that represent the answers to questions such as "When was Abraham Lincoln born?" or "Why is the sky blue?".

IE plays a role in IR because it identifies and normalizes information in natural language documents. This information improves the quality of search indexes and enables alternative navigation methods. It also brings IR closer to fielded database search because the diversity of expression in text documents has been disciplined through normalization. For instance, in the mergers and acquisitions example, the names of companies, persons, products, times, and events would be represented in a uniform and conventional manner. This makes it significantly easier to identify business activities for a given company such as IBM even if the original texts mentioned the company in many different ways (for example, using fully expressed names such as "International Business Machines Corporation" and "International Business Machines" or the acronym "IBM").

Although the development process for any given IE application will differ in important details than that for other IE applications, development normally requires a series of steps that are broadly similar over the spectrum of IE applications. A developer (or, for more complex information extraction tasks, a team of developers) creates an IE application. The code and data for the application may be entirely new, or may be based on existing materials. The problem the IE application is to solve may be well-understood in advance, or problem analysis and exploration may be an essential part of the process. In some cases, the exploration and analysis of a specific data set may be the final objective of an IE application, rather than the creation of a deployable system for analyzing similar documents.

During development, the developer may need to evaluate the IE application, by running the application on training and benchmark data, to understand how development is progressing and how accurately the application is expected to perform its intended task.

When the application performs with the required accuracy, it is deployed. IE applications may be deployed in a wide variety of environments, for many different purposes. In some environments, applications process large amounts of text in batch. In others, applications process individual documents, or small numbers of them, from time to time on the behalf of specific end-users. In yet others, end-users may explore a document collection for well established or "ad hoc" categories of information. In some environments, it is possible for end-users to provide feedback about the output of an extraction application. Given an interface with the necessary features, users can specify data in documents that the application should have found but did not, or found partially or completely in error. Under some circumstances, such feedback can be used for immediate adaptation of the underlying extraction system, where the application's accuracy is improved by automatically adjusting its behavior in response to the feedback.

In any case, when user feedback is available, it can be used by developers to make improvements to the application. Such improvements are deployed in subsequent versions of the application, whether the goal is to improve the application's performance, or to adapt or revise the application for a different domain or set of information extraction targets.

Traditionally IE applications have been developed by labor-intensive construction of hand-crafted rules; and more recently by applying machine-learning techniques on the basis of hand-annotated document sets, or by some combination of the two approaches. Both approaches have proved to be expensive and time-consuming, to demand significant discipline and quality control, and to require extensive domain knowledge and specialized expertise. IE applications have consequently been costly and hard to develop, maintain, and customize for specific or different environments or needs. These factors have limited the market for IE applications to organizations or companies with significant financial resources, and to information tasks for which the financial return on the investment made in development is high In addition to the complexities already mentioned, there are numerous ways an IE application may need to be customized or adapted. For example, a developer must determine which document structures (such as headings, sections, lists, or tables) or genres (E-mails, letters, or reports) the IE application should treat in a specific manner, or even ignore. Solutions to this problem, in existing systems, are often fragile and difficult to generalize since they are written for a specific application, domain, site, user, genre, or document structure. A developer must also determine which linguistic components (such as lexicons, word tokenization, morphology, and syntactic analysis) must be created or modified to deal with the unique linguistic properties of documents for the proposed extractions in the proposed domains. As a rule, linguistic components do not produce equally good results for all domains and document genres. For example, the style, vocabulary, and syntax of medical documents differ significantly from that of news articles. Linguistic components tuned to perform well in one domain are often less accurate in other domains.

A developer must likewise determine which specific domain- or site-specific information elements and relationships (such as persons, organizations, places, and other entities, times, events, and relationships among them) should be extracted. Experience has demonstrated that IE for a given information element developed for one domain often does not perform well in another domain, or even for another information source in the same domain. Furthermore, different domains often require completely different extraction targets. For instance, a biomedical application may be interested only in biochemical and genetic information while a business application may be interested only in stock prices.

A developer must also determine how IE targets and associated concepts should be organized: that is, the developer must create an "ontology" of the concepts relevant to the information extraction task. An ontology organizes and disciplines the development process (specifying the extraction categories, how are they defined, and how they relate to each other) and also provides inferencing capabilities for the IE application and applications built on top of the IE application. For example, in the ontology for a medical IE application, if "diabetes mellitus" is an "endocrine system disorder", it is possible to relate it to "acromegaly" and "hypothyroidism" and vice versa since they are also endocrine system disorders. Ontological relationships make it much easier to normalize, organize, and relate extracted entities; and consequently to search and navigate across them. Furthermore, medical ontologies such as SNOMED International SNOMED CT, a complex clinical medical nomenclature, possess rich semantic inter-connections to many other types of medical knowledge and allow a user to relate, for example, "diabetes mellitus" to the "pancreas" (anatomical site) and "insulin" (in two ways: deficient production of this hormone results in diabetes; and insulin injections—a medication—are used to treat diabetes).

At present, developing, customizing, or adapting an IE application demands weeks or months of labor by highly skilled specialists. Substantially shorter times, less expertise, and significantly less effort are necessary for IE applications to find a wider audience.

Machine-learning classifiers have been demonstrated to be highly successful techniques for identifying targets of interest for information extraction such as entities (persons, places, organizations), events, times, and relationships among them. Nevertheless, they are still not commonly used in commercial IE applications principally because of the difficulties and associated expense in obtaining sufficient labeled training data.

Information extraction research has also demonstrated how large unlabeled document collections and targeted developer feedback (such as in "active learning") can be used to train production classifiers either singly or in combination. These techniques likewise have been rarely employed in commercial IE applications. The result is that, even when classifiers are used, they are typically created during the development process and are subsequently "frozen," that is, treated as static components in the deployed application. It is well recognized that natural language systems cannot anticipate the diversity and complexity of linguistic expression. This is the principal reason that text and speech applications incorporate adaptation and feedback techniques. For example, spell checkers include at a minimum a "user dictionary" for words not found in the standard production word list. Speech recognition systems perform regular acoustic and language model adaptation to align themselves with the speech patterns of their users. These adaptive features increase the usability of such applications when they are deployed in specific environments for specific tasks. In contrast, IE applications errors may be so noticeable or frustrating, that users—in the absence of any techniques to reduce these errors—may abandon an application entirely as defective. There is therefore a need for an IE application that can adapt to the data it works on and the behavior of its users, showing improvement when mistakes are detected and corrected. For example, an IE application could learn from its successes and from its mistakes, such as when a person name has been mislabeled as an organization name, a company name has not been properly normalized, or an "employee-of" relationship between a person and a company is mistaken or missing.

One factor that has limited the exploitation of user feedback in information extraction applications is the difficulty of discerning the source of the error in the complex cascade of prior decisions that produced the erroneous result. Even if the source of the error can be established, it is unlikely that users, as opposed to highly skilled developers and information extraction experts, will be able to know how to modify the system or propose which application component should be adapted with the user feedback.

Furthermore, users often want to understand how complex IE applications make decisions. Providing explanations for the results of information extraction applications that rely on a complex cascade of analyses is very difficult even for someone intimately knowledgeable about the workings of the given IE application.

Documents are not just continuous sequences of words. Documents are organized through the use of text, text attributes, punctuation, whitespace, and graphics to separate, consolidate, and create relationships among the meaningful text elements that constitute the content of documents. Some document structures are so widely used that they have almost become formulas (for example, the address blocks and time expressions of business letters). Some document structures are encoded in consistent and standardized formats, such as E-mail headers, because purely automatic means exploit these formats to route documents over the Internet. However, the usual situation is far more complex.

For example, SEC financial reports must observe certain requirements for what kinds of financial information must be reported. Nevertheless, the organization and presentation of this information is as varied as the companies who file them. This problem can be reduced significantly if only a few sections of these financial reports are to be analyzed; all the same, the amount of variation in, say, profit and loss statements, is still daunting.

Irregularity and lack of uniformity of document structure is the rule rather than the exception. Document format standards are almost entirely absent in almost all fields in which information extraction is employed. Of course, information extraction applications are designed to process unstructured or partially structured documents. However, most information extraction applications have a very limited ability to accurately identify, categorize, normalize, and generally manage document structure and the content it encompasses. This is unfortunate because "unstructured" documents do typically have structure that is relevant to information extraction. Information extraction applications would benefit if the structure of documents were easily and reliably available. There are some sections of documents that are significant for information extraction. For example, the headers and footers of medical documents contain demographic metadata such as department name, report type, patient and physician name, patient age, patient sex, and so forth that may be important to extract. This metadata may in turn be critical to evaluating the content of the document: for example, progress notes normally are structured quite differently from discharge summaries. Similarly, breast cancer for a female patient is coded with a different ICD-9-CM medical billing code than breast cancer for a male patient.

A reliable source of information is also important. Some structural elements reliably contain information essential for information extraction. For example, E-mail headings contain the time the E-mail was sent. This time, in turn, can be used to resolve time references in the body of the E-mail (for example, "today", "yesterday", or "last week"). The "Medications" section of a medical discharge summary is generally a reliable source of current medications.

Some structural elements of documents should be ignored (or "filtered") during information extraction. For example, page turns and their associated document headers and footers should be ignored so that text is contiguous and uninterrupted. Furthermore, a selective extraction technique is usually desired: different sections of documents may need to be processed or interpreted in different ways. For example, a physician concerned with the on-going treatment of a patient may not want to give prominence to the diseases or procedures mentioned in the "History" sections of medical documents.

Other types of semi-structured data require special processing. Section headings should not be run into the text that precedes follows them. Lists should be interpreted as sequences of individual items. The elements of tables should be interpreted as items identified by column and row labels.

In spite of the evident significance of document structure analysis to information extraction, present IE applications typically have weak and fragile methods for managing or incorporating document structure in their processing. Ad hoc labor-intensive manual techniques are the state of the art. This process involve inspecting a set of (hopefully representative) examples of the documents to be processed and programming by trial and error a set of text processing programs or "scripts" to identify the data relevant for information extraction. This process is laborious, error-prone, and time-consuming. Furthermore, the resulting analysis frequently fails to generalize to other sets of documents, with the result that this process must be repeated for each document genre encountered.

In addition, the structure of the documents being processed may change (e.g., a financial report may be required to present new types of financial information), the structure processing scripts must be re-inspected and possibly revised. These changes usually take place unannounced, so an information extraction application may be ineffectual for some time until the document structure change is recognized and taken into account.

There is consequently a need for a document structure analysis system designed to remedy these recognized deficiencies of state-of-the-art systems.

A persistent problem for developers and users of IE applications is that they are not always fully aware of the nature of the documents to be analyzed and about the information extraction targets that ought to be sought. In addition to the previously discussed techniques for document structure analysis, one effective development method is to employ semantic exploration techniques. Semantic exploration engages unsupervised and partially supervised methods for identifying hidden, but salient semantic patterning in document collections. Semantic exploration assists IE in several ways: to understand the contents and organization of document collections used for developing IE applications; to reveal semantic categories that are potential extraction targets; to better understand the nature of already proposed extraction targets; and to provide sources of semantic data, such as "gazetteers" (lists of semantically related proper names), that play a role in creating an IE application.

Semantic exploration can be used to identify valuable extraction targets that are found in documents but were not considered important or even known to exist. For example, a collection of astronomy papers may also include the names and characteristics of astronomical instruments that are used to observe stellar spectrum data. Sometimes the categories identified by semantic exploration may not themselves be information extraction targets per se, but they can provide useful and sometimes highly reliable contexts for other information extraction targets. For example, an IE application may not be directly interested in place names or the names of saints, but place and saint names can often provide very reliable contexts for finding hospital names. Some semantic categories may be valuable because identifying them avoids confusing them with other extraction targets. Including such "negative" categories often improves the performance of IE applications. In addition, there is a need for semantic exploration techniques that can take advantage of structured knowledge sources such as ontologies and thesauri. This allows developers to identify concepts in documents that have been previously incorporated into these structured knowledge sources.

In spite of these evident benefits, to date IE applications have only infrequently integrated semantic exploration techniques for developing IE applications. It is desirable that such a semantic exploration system provide several ways for developers and users to gain semantic insight into documents targeted for information extraction. On the one hand, a semantic exploration system is needed with the ability to discover semantic categories in document collections quickly, without complex linguistic pre-processing, and demanding only limited developer input and feedback. On the other hand, a semantic exploration is also needed to explore patterning such as document clusters, document categories, similar documents, and related terms in document collections. This system should exploit but not require semantic knowledge bases and annotations, if available, and may require greater developer input and feedback.

SUMMARY OF THE INVENTION

The present invention includes an apparatus, system and method for developing tools to explore, organize, structure, extract, normalize, and mine natural language text. The natural language text may be unstructured or semi-structured. The system contains three sub-systems: the run-time engine, the development environment, and the feedback system. The development environment and run-time engine reduce development costs and improve performance through customization to local requirements and exploitation of user feedback, machine learning, and unlabeled document sets. The invention produces exploration, information extraction, and data mining applications for unstructured and semi-structured documents.

The development environment consists of components for document management, corpus indexing, document structure analysis, ontology processing and semantic exploration. The present invention also includes manual and machine-learning supported semi-manual annotation interfaces, a pattern-matching language, an application scripting language, scriptable workflows, a development management component, and a plug-in architecture for additional components. Deployed extraction and semantic exploration applications are executed by run-time engine supported by the user feedback system.

The present invention also includes an apparatus, system and method for improving the quality of information extraction applications consisting of an ensemble of per-user, adaptive, on-line machine-learning classifiers that adapt to document content and judgments of users by continuously incorporating feedback from information extraction results and the corrections that users apply to these results. The satellite classifier ensemble uses immediately available features for classifier improvement and it is mostly independent of the complex cascade of earlier decisions leading to the final IE result. At least one of the machine-learning classifiers provides explanations or justifications for classification decisions in the form of rules; other machine-learning classifiers may provide feedback in the form of supporting instances or patterns.

The present invention also includes an apparatus, system and method for document for identifying, normalizing, and managing document structure. The method may include determining a set of document genres, inducing document structure, normalizing structural labels and headings classifying documents by genre, determining missing structural elements; and determining when the document structure has changed.

In first aspect, the present invention includes a method for processing natural language text with an information extraction application having at least one processing component, where the method includes executing the following steps in a run time engine pre-deployment: gathering a set of input data, the set of data having a predetermined code associated therewith and normalizing the set of data into a predetermined format. The present invention also includes executing the following steps in a development environment: importing the normalized and formatted data into the development environment, defining an information extraction problem, selecting at least one subset of a data from the input data for exploration and development of the first subset data based upon the information extraction problem, adjusting the at least one processing component to match the problem definition and at least one of the input and the first subset data, annotating at least one of the input data and the first subset data to include predetermined annotations corresponding at least one of the input data and the first subset data and evaluating the resulting annotations to upon a predetermined accuracy threshold.

Some embodiments include extracting a data set from the set of input text according to the predetermined code, importing the extracted data set into the information extraction system, where the predetermined data including meta data about the text thereof.

Some embodiments include exploring the selected documents and annotating with using manual and automatic methods, defining annotations for the information extraction problem and selecting predetermined accuracy thresholds. The application is then deployed Some embodiments include collecting end-user feedback information from the information extraction application where collecting end user feedback information includes aggregating feedback information for all end users and all documents, aggregating feedback information for a specified user and the specified user's documents, and adapting the run time engine to increase the performance of the information extraction application.

In a second aspect, the present invention includes an apparatus having a computer readable storage medium on which is embedded one or more computer programs, where the one or more computer programs implement a method of processing natural language text and the one or more computer programs comprising a set of instructions for executing the following steps in a run time engine pre-deployment thereof: gathering a set of input text data from an information extraction application, where the text has a predetermined code associated therewith, extracting a data set from the set of input text according to the predetermined code, and normalizing the extracted set of data to a predetermined format. The present invention also includes one or more computer programs implementing a method of processing natural language text where the one or more computer programs include a set of instructions in a development environment, executing the following steps: defining an information extraction problem, collecting documents for exploration and development, exploring the document collection, adjusting processing components to match the problem definition and documents definition, annotating the documents using manual and automatic methods, evaluating the resulting annotations, and deploying the application, The present invention also includes one or more computer programs implementing a method of processing natural language text where the one or more computer programs includes set of instructions to collect end-user feedback information from the information application, and adapt the run time engine to increase the performance of the information application.

In some embodiments the apparatus includes computer programming to aggregate feedback information for all end users and all documents and to aggregate feedback information for a specified user and the specified user's documents.

In a third aspect, the present invention includes a system for processing natural language text using at least one computer, where the system includes a run time engine in a first instance, having a conversion module, data-driven and rule-based annotators, a set of standard components, ontologies, tokenizers, structure recognition components, and developer created processing scripts. The system also includes a development environment element having a development management system, a document management system, a development executive component, at least one annotation interface, a document structure system, an ontology management system, a development scripting language interpreter, where the development scripting language interpreter implements a first set developer created processing scripts and workflows, and a semantic exploration component. The system also includes a feedback module with at least one client component in communication with the runtime engine in the first instance and a first logging component for collecting user feedback for all applications in communication with the development environment.

In some embodiments the structure recognition components include document type and structure models.

In some embodiments the run time engine also includes a development created components module. The development executive component also includes the runtime engine in a second instance. Some embodiments include a document clustering system, a second logging component.

In some embodiments the feedback system is in communication with the runtime engine in the first instance having a per-user copy of a satellite ensemble in communication with the client components. In some embodiments the first logging component is in communication with a document management system.

In a fourth aspect, the present invention includes a method for constructing an information extraction application, where the method includes defining an information extraction problem, collecting documents for exploration and development, exploring the document collection, adjusting processing components to match the problem definition and documents definition, annotating the documents using manual and automatic methods, evaluating the resulting annotations, and deploying the information extraction application.

These and other embodiments are disclosed and claimed in the following detailed description and appended claims sections.

BRIEF DESCRIPTION OF THE DRAWINGS

While the specification concludes with claims particularly pointing out and distinctly claiming the present invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the Figures, wherein:

FIG. 1 shows an overview of elements according to one embodiment of the invention;

FIG. 3a shows an overview of elements of the development environment according to one embodiment of the invention;

FIG. 3b shows a more detailed view of the development executive element of FIG. 3a according to one embodiment of the invention;

FIG. 3c shows a more detailed view of the document management system element of FIG. 3a according to one embodiment of the invention;

FIG. 3d shows a more detailed view of the document structure analysis of FIG. 3a according to one embodiment of the invention;

FIG. 5 shows a flowchart of processing in a typical information extraction application;

FIG. 6a shows a flowchart of typical information extraction application development;

FIG. 6b shows a more detailed flowchart of the semantic exploration phase of information extraction application development as shown in FIG. 6a;

FIG. 6c shows a more detailed flowchart of tuning low-level linguistic analysis components according to one embodiment of the invention; and FIG. 6d shows a more detailed flowchart of a typical co-training workflow according to one embodiment of the invention.

DETAILED DESCRIPTION OF THE PREFERRED EMBODIMENTS

Figure 2A:
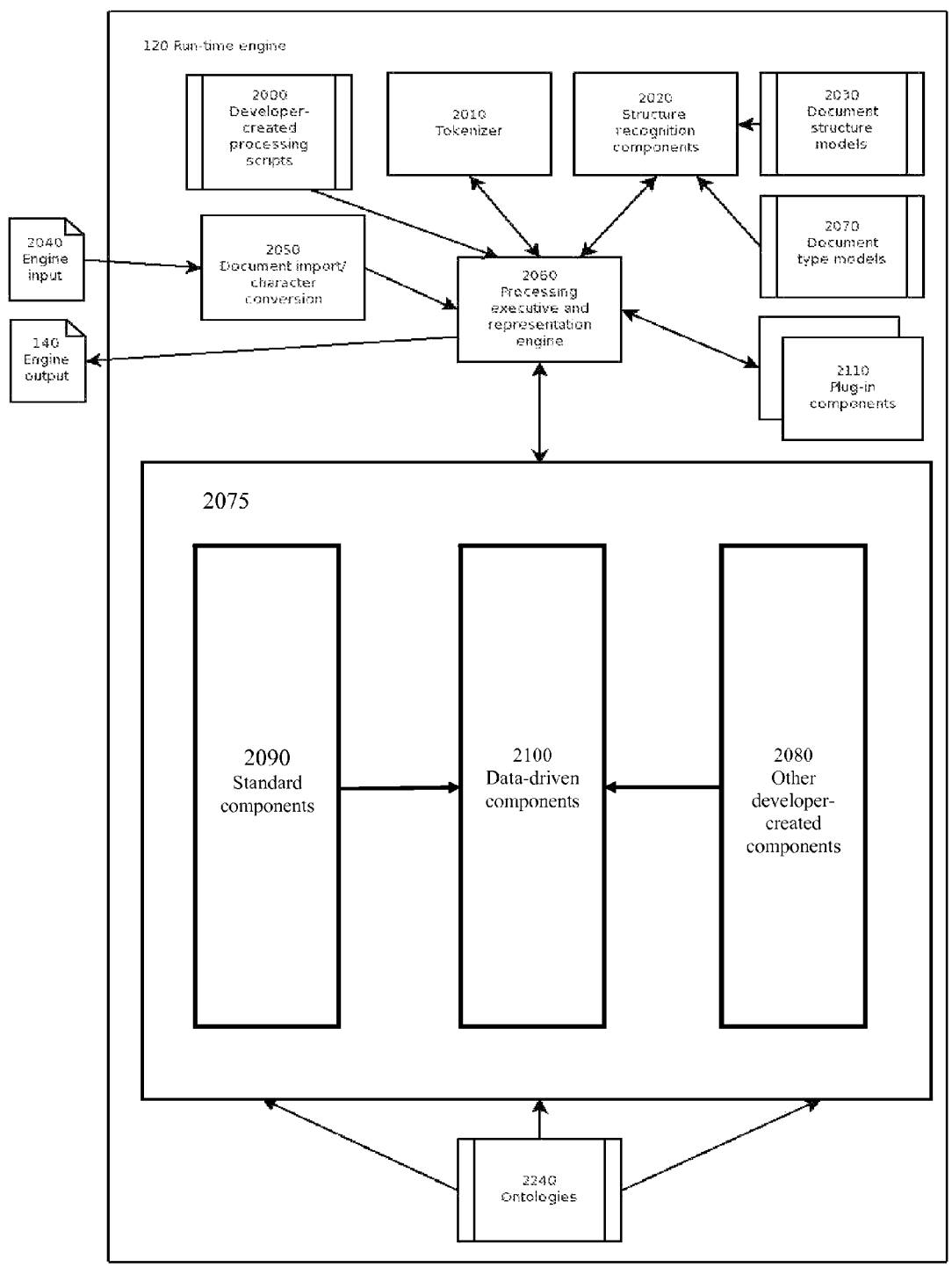
FIGS. 2a and 2b show an overview of elements of the run-time engine according to one embodiment of the invention.

The present disclosure will now be described more fully with reference to the Figures in which an embodiment of the present invention is shown. The subject matter of this disclosure may, however, be embodied in many different forms and should not be construed as being limited to the embodiments set forth herein.

The invention described herein may consist of the following three computer-based or software-based subsystems:

A Run-time Engine: This subsystem extracts and normalizes data from input text, according to the code and data in an IE application. It is used before deployment as a data exploration tool and to run applications for various development and evaluation purposes; after deployment, it runs production extraction and exploration applications.

A Development Environment: This subsystem provides the framework for creating, modifying, evaluating, and deploying IE applications. It has components for document set development, organization, structuring, management, and evaluation; extraction application development, management, and evaluation with unsupervised, semi-supervised, and fully supervised annotation workflows and annotation task-specific user interfaces; ontology development and management; and A Feedback System: This subsystem collects end-user feedback on the output of IE applications, and provides adaptation capabilities that improve the performance of IE applications.

The invention disclosed herein advantageously provides a full range of functionality in order to overcome the prior art deficiencies. Developers are provided with a powerful, full-featured toolkit to create high performance, portable applications quickly and at significantly less cost than existing technologies.

The present invention may be implemented with the use of computer as a software development kit (SDK) and may be designed to handle applications with large numbers of documents. The SDK may be programmed to provide the developer with information about how documents are structured (document structure analysis), how documents are related to each other (document clustering), and the range of semantic content found in the documents (semantic exploration).

The present invention incorporates a standard suite of linguistic and information extraction functionality that will allow developers to create a wide range of information extraction applications without additional programming, but if necessary developers can incorporate other linguistic processing and machine-learning algorithms and techniques via a plug-in architecture. The integrated application scripting language also allows the developer to create new workflows or to modify existing workflows without having to program low-level management code. Scriptable techniques for managing developer and user feedback are also integrated into the application environment.

Highly efficient and easy-to-use annotation workflows and interfaces combine with unsupervised and supervised machine learning techniques make dramatic reductions in the labor and time to develop annotated data and improvements in the quality of classifiers and hand crafted rules.

No research or commercial IE application, framework, or SDK offers a remotely similar approach to annotation workflows and interfaces. As a rule, information extraction development user interfaces are all variants of a single document view. A human annotator swipes one or more sections of text and then selects a label and in some cases fills out additional data fields associated with the highlighted text. A few annotation tools provide a concordance or spreadsheet-like summary of labeled items and their attributes.

Prior to the invention disclosed herein there have been no task-specific annotation user interfaces. There have also been no multiple-user annotation workflows that support the kinds of team development typical in production environments. There have also been no multiple user interface annotation workflows in which two or more user interfaces (for example, named entity annotation using an instance view, a document view, and a list view) are combined such that an annotator can freely switch back and forth between views, and where the results of annotation in each of the views is propagated to all the other active views. The structural component, line, swipe, and aggregation modes of the document view involve highlighting passages of text and selecting a label for that text (or relationship among the text segments highlighted). However, the majority of annotation interfaces, in particular the instance annotation, category annotation, quick review, differencing, and evaluation interfaces, do not follow the traditional "swipe and label" model. For example, the instance annotation interface takes advantage of perspective similar to a keyword-in-context concordance to offer such functions as the ability to sort on multiple fields, the ability to create sort keys, and multiple annotation columns for labeling and recording annotation metadata.

All annotation interfaces are linked directly to document annotation data structures that are immediately updated as changes are made in a given user interface; and changes appear immediately in alternate user interfaces such as the category or instance annotation interfaces. Finally, all annotation operations are logged providing a detailed record of all actions performed by the developer. The annotation environment also offers the ability to "unwind" annotations or return to an earlier annotation state. The SDK of the present invention may be developed in Java and C++ and can handle any language that can be represented in Unicode.

The development environment and run-time engine advantageously lowers software application development costs and improves performance through customization to local requirements and exploitation of user feedback, machine learning, and unlabeled document sets. Developers can script customized work flows and processing for the development environment and run-time engine. Developers may also control the number and type of classifiers in the classifier ensemble, the pre-deployment training of these classifiers, and the features monitored by the implemented classifier ensemble.

Natural language documents possess varying degrees of structure. At one extreme are unstructured documents where text, with no display or font information, and at most minimal structure such as paragraphs and sentences, is present.

Semi-structured documents have identifiable document structure elements such as titles, headings, lists, and tables. These include documents in conventional genres, such as letters and E-mails, which may have structural elements such as sender and addressee addresses, dates, subject lines, salutations, and attachment and routing designations. However, these structures are not always present, are frequently inconsistent, and may differ dramatically from domain to domain and genre to genre. At the other extreme lie structured documents, characterized by a well-defined markup language and structure specifications such as SGML or XML.

The content of natural language documents is typically not presented in a structured way. Natural language documents such as letters and E-mails often contain content such as names, organizations, places, times, events, and relationships among them. However, except in the rarest of cases, this information is found within the normal flow of text narrative in an unstructured or at best semi-structured way. For example, an E-mail might indicate the name of the addressee in a structured way its formal header as well as in the salutation in the body of the E-mail itself. The invention includes a document structure analysis component to allow developers to analyze and incorporate document structure information into IE applications. The developer can adapt or customize the analysis to local requirements. The system also detects changes in document structure and can alert developers to these changes.

The present invention advantageously improves the current state of the art by providing the following previously unavailable combination of features, namely the ability to customize any processing sub-system using a pervasive plug-in architecture; the ability to use scriptable applications rules to control the workflows performed by the development environment; and the ability to use scriptable application rules to regulate the workflows performed based on the data being processed. Since the largest cost of IE technologies is their development and customization, particular attention is given to techniques and workflows that optimize the time, labor, and cost of developing accurate IE.

No production system can anticipate the data that a given individual will experience. Consequently, the present invention exploits user feedback to improve the measured quality (for example, recall and precision) of the deployed IE technology.

The present invention is designed to work with already deployed IE applications, whether that system was developed using rule bases or annotated classifier development and evaluation data sets or a combination of the two approaches. The present invention does not require that a new IE application be built from scratch if one has already been developed or deployed. The present invention can also be used as a semantic exploration tool to assist in the improvement or enhancement of an existing system (or to develop a new layer on top of the existing system) that can also be deployed as a semantic exploration application. The present invention can be used as a "post-processor" to provide ways to investigate and evaluation the performance of an already existing IE application and can be used to improve and extend an already existing IE application.

Referring now to FIG. 1, the present invention 10 is comprised of three integrated systems, which come into play at various points of the IE application life cycle. A run-time engine 120 extracts and normalizes data from input text, according to the code and data in an IE application. It is used before deployment as a semantic exploration tool, and to run applications for various development and evaluation purposes (as detailed below in FIG. 3a, no. 120a); after deployment, it runs production applications.

A development environment 100 provides the framework for creating, modifying, evaluating, and deploying 110 information extraction applications.

In appropriate environments, a feedback system 160 collects end-user feedback 130 and 150 on the output 140 of information extraction applications, and provides adaptation capabilities that improve the performance of information extraction applications.

Referring now to FIG. 2a, Run-time engine 120 is shown with major subsystems. A representation engine 2060 is a component that manages the internal representation of a document and its annotations. The first step in processing any document is to read that document 2040 through a document import and character conversion process 2050, which transforms the document into the format required for representation in the representation engine.

A processing executive 2060 is a component that controls the overall processing performed by an application according to directives in a processing script 2000. The processing script specifies under what conditions, and in what sequence, subcomponents of the application are to be applied to the input document 2040.

Structure recognition components 2020 may perform analysis to divide the input into its large constituent structural units: headers, footers, section headings, sections, subsections, paragraphs, lists, tables, field labels, field values, and so forth. This analysis is performed according to document structure models 2030 that have been created for various document types, as part of the IE application development process. The input document type is computed according to document type models 2070 also created during the development process.

A tokenizer 2010 is a component that breaks the input text of a document into "tokens" which are linguistically-relevant units of text (such as words, punctuation marks, and sequences of whitespace) that are the basis of subsequent processing. Data-driven or rule-based annotators 2100 are a family of components that perform mechanical annotation on text. Each of these components may take as input the document in tokenized form, with its structural analysis and its other current annotations, as represented in the representation engine 2060. These components apply to a specification of patterns of document tokens and/or annotations to match, and actions to take when matches are found. The actions specify new annotations to make, existing annotations to modify, or existing annotations to remove. The actions are performed on the data in the representation engine.

Some of these specifications of patterns and actions are provided as part of the run-time engine system as the standard components 2090 which are discussed in more detail below with respect the component 2075 in FIG. 2b. Most applications will also have other, developer-created components 2080 for the data-driven annotators 2100.

Figure 2B:
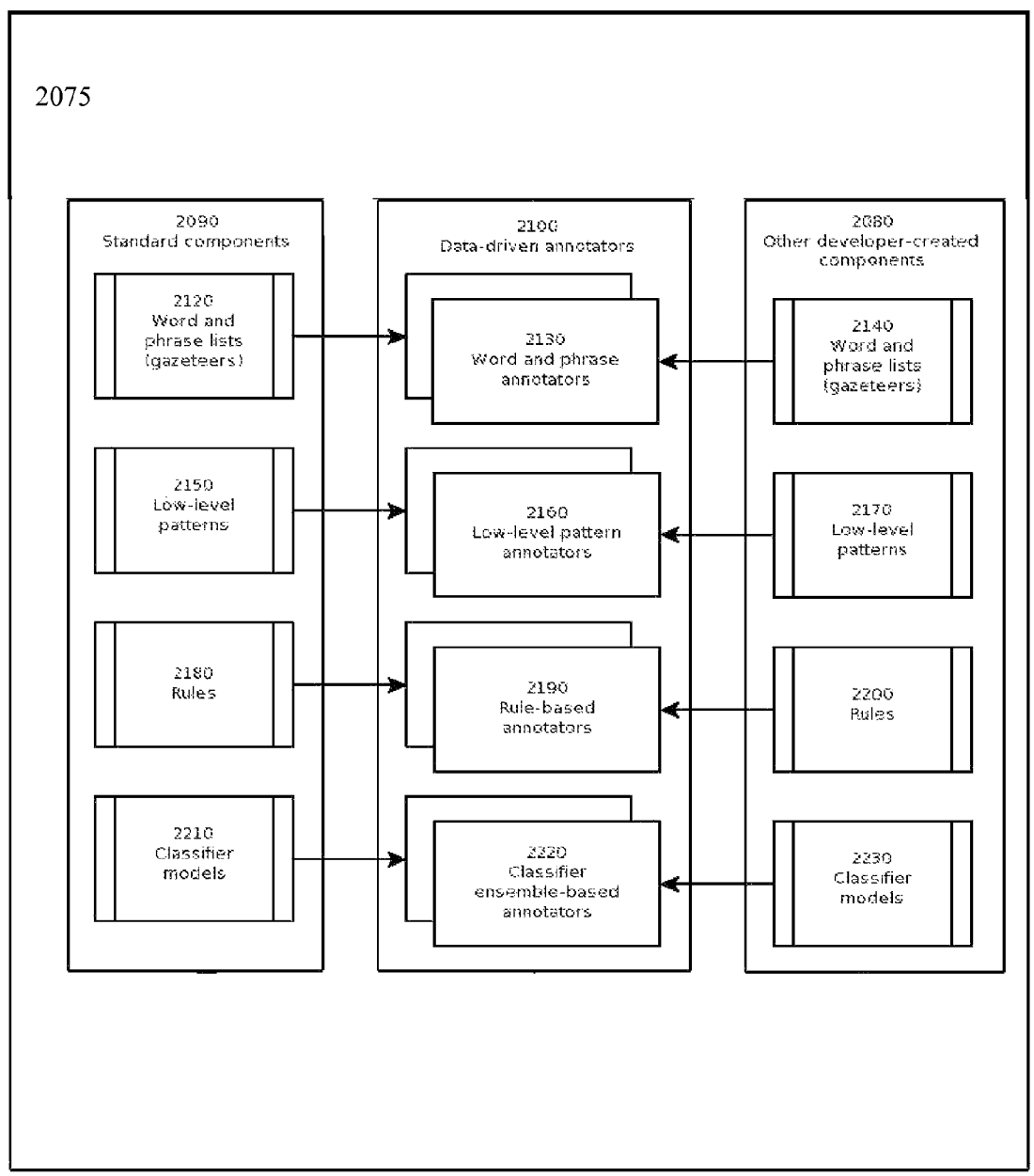

Referring now to FIG. 2b, components 2075 are shown in detail. The data-driven annotators 2100 differ in the way the patterns to match are specified. There are four varieties of annotators. Word and phrase annotators 2130 match and annotate specific words and phrases. The behavior of such an annotator is specified with a word/phrase list (also called a "gazetteer") which gives the actions to be performed when the various words or phrases are matched. Such specifications exist as part of the standard components 2120, and new specifications of this kind can also be defined by the developer 2140.

Low-level pattern annotators 2160 find (generally short), well-defined sequences of characters, words, phrases, and annotations in the document text that can be specified in a low-level regular-expression rule language. The behavior of such an annotator is specified with a list of pattern-action rules which provide the action to be performed when the various expressions are matched. Such specifications exist as part of the standard components 2150, and new specifications of this kind can also be defined by the developer 2170.

Rule-based annotators 2190 match essentially arbitrary conditions that can be computed over the text, annotations in an input document, and other available information, as specified in rules defined in a rule language. The behavior of such an annotator is specified with a list of rules which the associated actions to be performed when the various rules are matched. Such specifications exist as part of the standard components 2180, and new specifications of this kind can also be defined by the developer 2200.

Classifier ensemble-based annotators 2220 match essentially arbitrary conditions computed over the text, annotations in an input document, and other available information, according to a model developed using any of a variety of machine-learning algorithms, over some set of training examples. Such models exist as part of the standard components 2210, and new models can also be created by the developer 2230.

Any extraction application functions by applying a set of the above data-driven annotators, instantiated using various specifications or models, to the input document and its current annotations, as represented in the representation engine 2060. The annotators analyze the text in stages, under the dynamic control of a processing script 2000. The tokenization, structural analysis, and all prior annotations are available to each subsequent annotator to match, as it is applied. Analysis culminates in the annotations that represent the entities, relationships, and normalizations that are emitted as the output of the extraction application 140.

The standard components 2090 are a set of specifications and models for the data-driven annotators that perform certain basic linguistic analysis on input text, such as tokenization, low-level pattern-based semantic annotation, part-of-speech tagging, linguistic phrase analysis, and so forth. The standard components are shipped as part of the engine (and development environment) can be used directly in extraction applications, or as a means to bootstrap data used to develop components with similar functionality, that are better-tuned to the developer's specific data and problem space.

Ontologies 2240 are one or more networks, representing a set of concepts and relationships among them. Concepts and relationships in ontologies can be used in the annotations that are created, modified or deleted by the actions of data-driven annotators. For example, a data-driven annotator might label a word, phrase, or other matched pattern with a semantic category that is part of a larger ontology of semantic categories. The categories and relationships in ontologies are accessible to the rule-based annotators and classifiers to provide inferencing and generalization capabilities. They may also used when searching, filtering, and organizing extracted information.

Continuing with FIGS. 2a and 2b, the present invention supports a pervasive plug-in architecture. Aside from developing their own data, rules, and models for use in the structure analysis and data-driven annotator components 2100, developers can also replace any of the processing components that are a default part of the run-time engine with their own versions, or add new processing components of their own 2110. Plug-in components 2110 are third-party or developer-created processing components that replace existing components of the engine, or add new functionality to it. There is no limitation placed on the complexity of plug-in components. A plug-in component itself could perform such complex tasks as the entire information extraction and natural language processing of an existing information extraction application. Plug-in components 2110 are developer-created processing components that replace existing components of the engine, or add new functionality to it. The plug-in architecture works in two different modalities.

In one modality, the developer creates components of executable code that are closely integrated with the run-time engine by virtue of using the engine's internal APIs and data structures. The second modality relies on the use of a defined interchange format.

The interchange format is a machine-readable text format that can represent a document, its structural analysis, and its annotations at any point, including intermediate points, of its processing by the run-time engine.

For a plug-in component that uses the second modality, the develop creates a script or computer program (or adapts an existing one) in any computer language, which reads documents in the defined interchange format as input, processes them in some way, and produces as output modified documents, also in the defined interchange format.

The engine integrates with the plug-in component by exporting documents in interchange format, executing the plug-in component in a manner configured by the developer, and importing the resulting output. IE applications can combine the operation of default components and developer-created plug-in components in arbitrary ways.

Referring now FIG. 3a there are shown elements of the development environment 100. FIG. 3b shows the development executive and data component 3020 which includes an instance of the run-time engine 120a dedicated to development use and the elements of an IE application under development: document type models 2070, document structure models 2030, ontologies 2240, plug-in components 2110, other developer-created components, i.e., specifications for data-driven and rule-based annotators 2080, and processing executive scripts 2000.

Referring now to FIG. 3c, there is shown a document management system 3005 allows developers to import, export, and manage corpora (collections of documents used to develop, tune, and evaluate the performance of information extraction applications 3000). In addition, this system allows corpora to be sampled in various ways, for a variety of development, tuning, and evaluation purposes. Other capabilities of the document management system include duplicate document detection and version control.

A corpus indexing system 3040 maintains an index of the tokens and annotations that have been made to development corpora at any given time 3010. This index is used by a number of the other systems to facilitate navigation of the data, and various computations over it, via the document management system interface 3070.

A document clustering system 3110 allows developers to divide a large, unknown corpus into groups of similar documents automatically. An interface is provided 3150 to allow the developer to revise the results of clustering. The clustering system can be used for semantic exploration, and also to assist in creating a document structure type model for the run-time engine 2070.

Referring now to FIG. 3d, there is shown a document structure system 3100 being used by a developer to create and tune document structure models 2030 for the run-time engine. This permits engine applications to recognize the headers, footers, section headings, sections, subsections, body text, lists, tables, field labels, field values, etc. accurately, as they occur in the document types comprising the input of the application under development. The document structure system is also used to analyze and categorize document work types so that this information can be used by the run-time system to guide processing and information extraction.

An advantage of the proposed document structure analysis system is maximizing of the value of automated methods and developer feedback, thereby reducing supervision to a minimum. Document structure analysis provides powerful, general methods for managing document structure including determining sets of document genres, inducing document structure, normalizing structural labels and headings, classifying documents by genre, determining missing structural elements; and determining when document structure has changed.

The techniques applied in the document structure analysis of FIG. 3d methods are already standard components of the development environment 100 such as clustering 3110a, classification, annotation interfaces, 3130a and heading and label normalization 3400 using de-duplication. Document structure analysis uses these standard components with structure-specific attributes 2020a, for example, page position, whitespace, delimiters, list enumerators, and low-level semantic categories 2150a such as dates and addresses that can play a significant role in document structure.

On the other hand, there are some techniques that are unique to document structure analysis, such as the use of seed patterns to identify candidate headings and labels; document grammar induction; determining whether documents match document grammars and if not, how they differ; identification of generic document genres and structures such as headings, lists, and tables; and a variant annotation interface specialized for table analysis.

There are two types of document structure analysis methods: partially supervised and supervised. Partially supervised (that is, partly automated, partly manual) methods are typically used when many documents are available. Supervised (that is, manual) methods are typically used when the developer has only a very few examples (typically fewer than ten instances) of each document genre.

When a collection of documents is available, the first step in document structure analysis is to cluster these documents and suggest natural groupings of these documents ("genres"). Next each genre cluster is analyzed in detail and its labels and headings are identified and normalized. Once a catalog of normalized headings and labels is constructed, document structure analysis automatically determines the "grammar" (the catalog, frequency, and sequence dependencies of structural elements); and generates data to classify new documents by genre in order to process new documents. Only the initial steps are a combination of automatic and manual methods where developers review and, if necessary, modify automatically generated candidates. All succeeding steps are fully automated.

Documents maybe clustered in a completely unsupervised manner or the developer may provide "seed" data in the form of a set of already categorized documents. The developer then reviews clustering results, and, as necessary, merges or splits document clusters and moves documents from one cluster to another. This clustering is based not on the content of the documents, but on the structural and organizational attributes of documents. Once a satisfactory set of clusters has been produced, the developer turns to the analysis of labels and headings and major text segments which make up the basic constituents of document structure. Candidate labels and headings are extracted automatically using a small set of pre-defined patterns; heading and label variants are clustered and a canonical forms are generated; and the heading and label candidates are presented for review in a category annotation interface. The category annotation interface allows the developer to delete, add, and modify entries; change canonical forms; and move entries from category to category. The entries in the category interface are also linked to the documents in which they appear so they can be viewed in context. Document labels and headings can also be inspected in a document annotation interface that allows the developer to view a "collapsed" view containing only headings and labels; and to review large numbers of documents in a "slide show."

If only a few examples of documents are available, the semi-supervised approach is not likely to work effectively. In this case, the developer can use the document annotation interface to quickly "swipe" (highlight) labels and headings. These labels and headings are automatically organized in the category annotation interface where normalization can be done. If the developer already has a set of canonical labels (for example, there may be site-specific or industry standards for document structure), the best matches are presented to the developer.

Genre classifiers and grammars are generated automatically once headings and labels have been identified. If additional development documents are available, the adequacy of the catalog of genres, headings and labels, and the induced document grammars can be further evaluated. This process may identify "outliers," documents that are significantly different from those in the original development set, and headings and labels and their sequences not seen in the original development set. The developer can then incorporate feedback from the review of these exceptional cases.

The document structure analysis tools also contain a baseline set of generic structure identification methods for frequent document genres such as E-mails and letters; and for common document structural elements such as titles, headings, lists, and tables.

If lists and tables are not identified, their contents are normally processed very poorly by standard information extraction techniques. However, since lists and tables are very regular, structured presentations of information are roughly the equivalent of small spreadsheets or databases in documents.

Lists and tables require their own document structure analysis techniques. Factory list and table section classifiers will be provided as standard components. Both list and table sections can be distinguished reliably from each other and from other parts of documents.

The most significant and valuable part of list processing, however, is the accurate alignment of list contents with list identifiers (typically, numbers, letters, and bullets). A factory list content classifier is also provided as a standard component. Consequently list content analysis can be performed in an unsupervised manner. Nevertheless, best development practices suggest that a manual review of a sample of automatically recognized and parsed lists should be performed, for example using a "slide show" user interface. If errors are noted, the developer can analyze the problem and incorporate feedback to improve the list and list content classifiers. If a sufficiently large document collection is available for classifier development, the developer may create fully customized classifiers using training data drawn exclusively from the document collection.

Similarly, the most important part of table processing is the accurate alignment of data into cells by column and row; and the assignment of categories to these cells based on column and row headings.

It must be emphasized, however, that effective table analysis can be done only if documents are presented in a "display" format that presents the table as it would be printed or displayed on a screen. In other words, the input format for table analysis should preserve the graphical organization and associated whitespace and, if possible, character attributes such as font type (such as "italic" or "bold") and size.

The table processing method organizes the contents of the table into rows and columns, with row data divided into data and label cells and the scope of column and row labels identified. This data is presented in three annotation interfaces: an "instance" interface with items organized by row and column, with links to both a "document" interface for inspecting the data in the context of the original document and to a category "annotation" interface that presents the cell information categorized by column and row headers. If standard category labels are provided, the category annotation interface will also present best matches. The standard tightly integrated instance, document, and category interface editing functionality is available. For example, if the content of a cell is changed in the instance interface, corresponding changes appear immediately in the corresponding document and category interfaces, and vice versa. After the table data has been organized and labeled properly, a custom table classifier is generated. The developer can follow the standard development steps of evaluation and error analysis, as well as continued analysis by processing, reviewing, and evaluating more training data. The table classifier may then be deployed in the run-time system. Extracted list and table data can be exported in XML or tabular ("spreadsheet") format.

Referring again to FIG. 3*b*, an ontology management system 3050 allows developers to create, import, export, modify, and maintain compiled, process-oriented ontology data 2240, and to perform various kinds of integrity checking on this ontology data. The ontology management system is only to implement, not to design, develop or maintain structured knowledge bases such as controlled vocabularies, taxonomies, classification schemes, thesauruses and ontologies.

The semantic exploration component 3080 as shown in FIG. 3*a* takes as input a corpus of text along with, if available, lists of examples of desired extraction targets, topically relevant knowledge bases (such as controlled vocabularies, taxonomies, classification schemes, thesauruses and ontologies), and user-supplied terms or phrases, documents, or categories.

There are two main methods provided for semantic exploration. The first is primarily used for collecting terminology to build lists of terminology ("gazetteers") and to collect concepts to be developed and organized into semantic thesauruses and ontologies, and to generate training and evaluation data for the development of tools to extract these concepts.

The second method for semantic exploration, uses relationships identified in a document collection. Minimally, this method uses the co-occurrence relationships among terms and documents in a corpus (the documents they occur in, and the terms they co-occur with).

In addition, when available, the set of relationships used for this method of semantic exploration can be augmented with the assignment to corpus documents, or parts of documents, of a (possibly hierarchical) set of topical categories and the contents of one or more semantic thesauruses or ontologies, containing concept-to-concept and term-to-concept relationships, and where relationships are classified by type (synonymy, hyponymy/hypernymy and so forth.)

A novel and unique technique of semantic exploration is described in further detailed in co-pending, co-invented and co-owned U.S patent application Ser. No. 11/820,677 filed on Jun. 29, 2007, now issued U.S. Pat. No. 7,538,778, which application has been incorporated by reference in its entirety.

Some IE applications use extraction techniques based on syntactic patterns such as subject-verb, verb-object, and subject-predicate-adjective to identify semantically significant expressions in the document collection. The syntactic pattern approach provides users with another perspective on the contents of a document collection, for example, relationships among the noun phrases of a document collection characterized by the actions that link them.

This syntactic pattern approach complements word and phrase-based semantic clustering. Semantic exploration captures relationships among words of arbitrary syntactic function (i.e., not just noun phrases, but also adjectives and their prepositional modifiers, verbs and their adverbial modifiers and so forth) that are not discoverable by a syntactic pattern approach based on noun phrases and verb groups alone.

Referring again to FIG. 3a, there is shown annotation interfaces 3130 are a collection of graphical user interfaces that provide the means for semi-automatic and manual annotation of corpora. Some limited manual annotation is often required when developing (for example) the data used to train classifier-based annotators, or data used to benchmark information extraction applications and their components. The annotation interfaces, individually and in their integrated behavior, are designed to make semi-automatic and manual annotation as efficient as possible.

A document annotation interface 3140 is designed for making manual annotations on individual documents. Interface 3140 may operate in a variety of interface modes tuned for specific annotation tasks, including:

Whole-document mode, which allows the entire document to be assigned to one of a fixed set of categories Structural component mode, which allows large structural units (such as section headings, entire sections, or paragraphs of body text) to be identified and annotated Line mode, which allows one or more lines of document text to be selected and annotated Swipe mode, which allows sequences of tokens or points between tokens to be selected and annotated Aggregation mode, which allows the developer to select one or more existing annotations in one or more documents, corresponding to entities, events, times, and so forth and to create an annotation representing some relationship among these or a consequence of these.

The document annotation interface additionally permits annotations or selected information data types to be filtered out (so they are not represented in the interface) or highlighted (so they stand out, to guide the eye toward them and facilitate review) or represented in different ways (for example, with different colors or color intensities or in a separate display pane). The interface also includes the capability to expand and collapse the major structural components of the document, and a sub-interface that allows a summary view of a document's annotations to be seen separately from the document text.

The instance annotation interface 3180 is designed for viewing and annotating multiple examples of related phenomena across an entire corpus, in the manner of a keyword-in-context (KWIC) concordance. Any number of different instance annotation views may be created for a given corpus.

An individual instance annotation view is created either by defining, in the rule-based annotation language, a specification of document tokens or by existing document annotations to match. Each matching span or location defines the focus of one instance in that view. Once created, additional instances can be added to the view, by expanding the match specification, or by manually adding foci using the document annotation interface.

In the instance annotation view, each instance is represented by a row of data with various columns including ones that give the location of the focus (i.e., the document in which it occurs and its position therein), its left context, the focus itself, and its right context. To assist in reviewing the instances, users may chose to hide fields or to reduce or expand them in size.

Additional columns may also be created such as sort-key columns, which are created by writing a specification, in the rule-based annotation language, of some reduction of the data in the focus, or in its context, into an arbitrary string or as a combination of data from different columns. A view can include any number of sort-key columns. By clicking on or selecting the corresponding column header, the view can be dynamically sorted according to the value of the key in that column. Multiple column header selections are supported, so that multiple-criteria sorts can be performed.

In addition label columns may be created by defining the set of categories in some ontology that can be used to classify the focus. Any view can include any number of label columns. One of the values in any label column stands for a miscellaneous or remainder category. The interface supports means to:

Assign a default value to all rows globally

Assign a value to a selection of multiple rows

Assign a value for each row by running a processing script that performs mechanical annotation to compute the value.

An instance annotation view may include one or more review columns. In developing classifier training or system evaluation data, it is useful to be able to collect and distinguish correct and incorrect instance of classifications, and to keep track of whether instances have been reviewed. For any instance, a truth-status column can contain values that denote instances which are correct, incorrect, questionable/unclear, or unreviewed.

An instance annotation view may include one or more representations of instances. For example, it may include the original or tokenized form of a given instance. This allows the developer to inspect the instance in a more natural and readable form. When a classifier is being used for annotation, it may include a representation of the featurization (the set of attributes used by the classifier) of a given instance. This allows the developer to inspect the features to determine how features relate to the class of the given instance and to determine whether or not featurization has been performed properly.

Data-driven annotation processes invoked during development workflows (see below) may introduce new instances into a particular instance view, or change the classification of old instances. The interface supports displaying instances, after such an operation, in a way that distinguishes the changes made to the data in the view by such an operation.

The category annotation interface 3170 displays a hierarchy of categories (which are a subset of categories defined in some ontology loaded into the development system) in the form of a tree. Associated with each node of this tree are either entire documents, or instances (see above), associated with the category. Each category node has a name. The interface also always includes a remainder category. A remainder category is used when an item for whatever reason cannot be placed in any of the categories provided by the ontology.

The category annotation interface 3170 makes it possible to move documents or instances efficiently from category to category, remove documents or instances from a categorization entirely by assigning them to a special null category, and to define, split, merge, remove, or edit the names of the categories themselves.

The category annotation interface 3170 will be used, for example, to manually edit the results of automatic document clustering (see above), or in the process of tuning the structure recognition components (for example, to edit classes and examples of section headings among documents in a corpus).

A quick review interface 3190 allows a developer to rapidly display instances in a corpus, in document context. The interface permits the developer to define an existing instance interface view to drive the review. The developer can specify which major structural units of each document displayed should be expanded and/or collapsed as the review is presented. The interface displays each instance in the context of the document that contains it, with the focus centered vertically and highlighted. Instances can be presented either automatically in succession (in the manner of a slide show) or under developer control, with the developer able to move to the previous or next instance manually.

The speed of automatic presentation can be adjusted. The developer can also interrupt the automatic review and change to manual mode, or resume the automatic review, at any point. In manual mode, the developer can navigate to the document or instance annotation interface to edit the current focus item, and then move back to the review interface.

A differencing interface 3160 is a variation to the instance annotation interface (see above). This is used to compare two different versions of an instance view which are built over the same corpus, and are intended to have the same foci.

The differencing interface 3120 can be used for multiple purposes. One use is to compare versions of an instance view before and after some change, or set of changes, made to some component or set of components in the application. In this setting, the interface is used for regression control.

Another use is to compare the instances generated by an application to a view of corresponding correct instances validated by human annotators. In this setting, the interface is used for accuracy evaluation and for error analysis.

A final use is to compare one instance view, with classifications and truth-status values generated by one human annotator, to a corresponding view generated by different human annotator. In this setting, the interface is used for reconciliation of semi-automatic and manual annotation.

The differencing interface 3160 is applied to two different versions of a given set of instances, and provides summary statistics about the number of instances identical between the two versions, different between the two versions, and present in one version but not the other.

From the summary statistics, the differencing interface 3160 provides the capability to navigate to a view, similar to the instance annotation interface, which displays the selected category of instances in a manner similar to the instance annotation interface or to a document view which displays the selected instance in the context of the document in which it appears. When displaying instances that are different between the two versions, the pairs are presented with their sources and differences visually distinguished.

For use in reconciliation, the differencing interface 3160 provides the capability to designate a set of selected instances to be correct, and the capability to mark one or the other side of a difference to be correct. It also provides the capability to re-annotate an instance manually, by the means provided in the instance annotation interface. As in the instance annotation interface, the developer can define sort key columns and sort the instances viewed dynamically. The interface also keeps statistics of reconciliation, to track which version was the source of the instances ultimately deemed correct.

An evaluation interface 3200, which is a subcomponent of the differencing interface, is used to present summary statistics when two versions of a set of instances are compared to evaluate accuracy. Here, one of the two versions is considered to reflect truth, and the other set is compared with the truth set, and statistics are generated and presented in the interface. The statistics presented include but are not limited to recall, precision, f-measure, and a confusion matrix. Developers can derive additional application-specific performance statistics from the confusion matrix (such as false positives, false negatives and ROC analysis) and by incorporating data from other sources (such as performance against out-of-vocabulary terms).

From the presentation of the confusion matrix, the developer can navigate to the differencing interface. By clicking on a cell in the matrix, the interface is invoked and displays the instances in that confusion category. As noted earlier, still other annotation views are accessible via the differencing interface. The evaluation interface supports scriptable comparison functionality, so that partial or near matches between two instance bases can be computed in various ways.

The manual annotation interfaces include sticky-note and style-guide capabilities. Sticky notes allow developers to associated comments with instances, annotations, spans of text, etc. Sticky notes can be displayed, as desired, in any interface that displays the data carrying the note. The style-guide capability allows developers to move exemplary instances from instance bases into another interface called a style guide 3210. Any number of style guides can be defined for various tasks. The purpose of the style guide is to allow multiple developers who are all performing related or coordinate tasks, for example, who have divided the job of annotating a particularly large corpus to communicate and track decisions about how to categorize and annotate data, particularly problematic or boundary cases.

A development scripting language is a computer language that can be used to control all components of the development environment. The development environment contains an interpreter 3060 for this language.

Workflows 3030, which are written in the development scripting language, guide developers through the tasks necessary to develop information extraction applications. Developers can use workflow scripts provided as default components of the development environment, or they can modify these, or they can write new workflow scripts, according to their needs.

A development management system 3090 allows developers to organize sets of related resources, for example, the corpora 3000, processing executive scripts 2000, ontologies 2240, and so forth, used to develop a particular IE application into projects that can be saved, resumed or copied for other developers. The development management system provides version control for scripts and data apart from the documents and corpora (which are tracked in the document management system). The development management system provides a logging capability 3120 that keeps track of developer activities over the history of a project.

Figure 4:
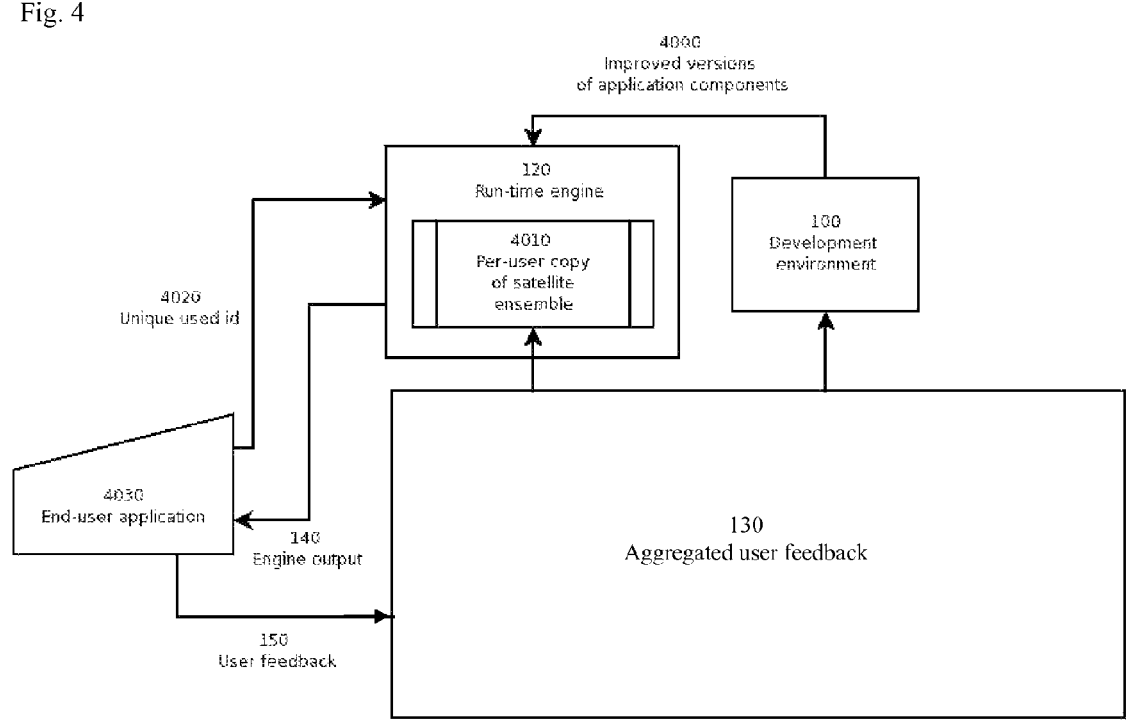
FIG. 4 shows an overview of the feedback system of FIG. 1 according to one embodiment of the invention.

Referring now to FIG. 4 there is shown an aggregated feedback system 130 interacting with development environment 100 and run-time engine 120 to support creation and deployment of satellite classifier ensembles 4010. These are components that provide immediate adaptation to end-user feedback.

A unique and novel technique for implementing a satellite classifier ensemble is disclosed and claimed in co-pending, co-invented, and co-owned U.S non-provisional application Ser. No. 11/821,060, filed Jun. 21, 2007 and entitled "CLASSIFIER ENSEMBLE", now issued U.S. Pat. No. 7,769,701, which application has been incorporated by referenced in its entirety.

When developers create applications in the development environment 100 those applications may include classifier-based annotators. When this is the case, at the developer's option, the development system automatically builds an additional, parallel satellite classifier ensemble, over the same training data, to be included as an element of the application.

The satellite classifier ensemble's classifiers may differ from the developer-specified ensemble in certain ways such as the features employed in building the classifier models, the algorithms and parameters used.

The data employed in some classifier algorithms (for example, neural networks) are represented in a way that makes it very difficult for a human to understand the relationship between an input example and its output class. On the other hand, other algorithms (such as rule induction systems) employ representations where this can be readily understood, and the algorithm can be used not only to produce an output classification for some input instance, but also an explanation or justification for the output classification in terms of the input features. Satellite classifier ensembles will always include one or more classifiers with the latter property.

The output of a satellite classifier ensemble is aggregated with the output of the ensemble it parallels to produce the final classification and annotation made on matching inputs.

When an application is deployed and running on the run-time engine 120 it invokes certain special functionality when the application includes satellite ensembles.

Satellite classifier ensembles are distinguished internally so that, when running an IE application that includes such components, the run-time engine is able to identify them, the components they operate in parallel to, and the output annotations these produce.

When running any IE application on behalf of a given end-user, the run-time engine will be passed a unique identifier corresponding to the end-user 4020. Given a unique user ID 4020 when running an application on behalf of a designated user, if the application includes satellite classifier ensemble components, the run-time engine may create a user-specific copy of these components when the application is first run on behalf of that user 4010 and may use the user-specific copy thereafter, each time that user runs the same application.

If the end-user's application 4030 provides feedback 150 to the output 140 of such an IE application identifying data the application missed, or identified wholly or partially in error, and if some satellite classifier ensemble is partially responsible for the classification that led to the error, then the ensemble is dynamically retrained, providing immediate adaptation to the feedback 150.

Referring now to FIG. 5 there is shown a process diagram for a typical IE application. The typical IE application processes an input document 2040 in roughly the following steps. Although these are presented in series, many of the analysis steps can be performed in parallel. Also, control of processing flow in real applications may be more complex; for example, steps may be performed (or not performed) depending on the results of previous steps.

The input document 2040 is converted from native format to an internal representation (which includes character set conversion) 5020. A document type may be computed using a document classifier, and structural analysis of the document is performed, to identify and delimit its high-level document structure components 5050.

The document may then be tokenized 5080 and a series of low-level linguistic analysis steps 5000 may be performed. These include low-level semantic tagging (identifying entities such as numbers, units of measurement, place names, times and other items listed in gazetteers, etc.) 5030, part-of-speech tagging 5060, phrase and clause identification 5090; and syntactic relation annotation 5110.

Building on the analysis of document type, structure, and the low-level linguistic analysis, a series of information extraction steps 5010 is performed. These identify such information-bearing elements in the document such as its entities 5070, events 5100, times 5040, and relationships of interest 5120, normalizes them and de-duplicates them 5130. Each individual step may be composed of multiple sub-steps.

Each analysis step consists of running one of the data-driven annotators, or a plug-in component, over the data in the representation engine, which contains the document and its analysis at any given time. Each step makes modifications and additions to the analysis, culminating in the annotations that comprise the output of the extraction application 140.

Referring now to FIG. 6a, there is shown a flow chart of a typical flow of IE application development. A developer typically progresses through several stages in constructing an IE application. Initially the developer defines the information extraction problem 6000 and undertakes to collect documents for exploration and development 6020. After exploring the document collection 6040, the developer may adjust processing components to match the problem definition and structure of the documents 6060. Thereafter, application development may occur, including annotating documents using manual and automatic methods 6010. An evaluation of the resulting application may be performed 6030 followed by deployment of the application 6050.

In some instances the developer often starts only with a rough and still poorly informed idea of the problem that need to be addressed by the IE application. Even when the precise goals of the application are understood, it is usually difficult to anticipate all the ways the target data is presented in natural language text. Defining the information extraction problem involves a number of steps including determining which targets (for example, persons, places, times, events, and relationships) and information sources the IE application should address. Often a developer has been given the task of extracting very specific kinds of information from specific documents or document sources. However, the nature of this task may change, for example, if exploration of information sources shows that there are more or different targets possible, that the targets can be defined in more or less fine-grained or even different ways, or that the sources do not provide the targets requested.

The developer may also define these targets and how they relate to each other. Target definition is critical to the success of an IE application. Without this definition, it is very difficult for developers to annotate accurately and consistently; and it is not possible to perform reliable evaluation of application performance. Target definition consists in determining the set of targets that are to be extracted and how these targets are to be distinguished from each other. It might be important, for example, to separate targets that provide precise indications of time (such as dates expressed in a form like "Jan. 1, 2005") from targets that provide only vague or imprecise indications of time (such as the imprecise time expressions "next week" or even "sometimes", "never" or "always").

In addition the developer may define the document sources and their nature and how they affect information extraction. Information sources vary significantly in structure, content, and the number and kinds of information extraction targets they contain. The documents used for application development should be representative of the documents expected to be processed, otherwise there will be little confidence that the IE application will perform properly when it is deployed. Anticipating the structure and content of the documents to be processed is consequently vital in creating a successful IE application.

The developer usually must determine whether an application has been previously developed for these or similar targets and information sources. It is sometimes possible to re-use an existing information extraction problem definition or base a new one on an already existing one.

Finally the developer must decide on the mix and arrangement of hand-crafted and automated techniques for development. The above enumerated steps are not required to be performed in a serial order. One successful approach to problem definition is to create a rough problem definition, perform exploratory investigation of representative documents, and then refine the problem definition. This process may be repeated several times before a definition satisfactory to developer and users has been achieved. This process starts by creating a rough description of extraction targets and working with a set of documents representative of those that will be processed by the deployed application.

Referring now to FIG. 6b there is shown a typical flow chart of the semantic exploration phase of IE application development. As discussed above, the initial collection of documents is stored in the document management system 6200.

Once the initial collection has been tokenized 6210 and, if it is sufficiently large to warrant this, sampled 6220, occurrences of particular tokens, words, or phrases can be viewed in the fashion of a keyword-in-context concordance 6270, using the instance annotation interface of the development environment.

Document clustering 6230 is an unsupervised process that identifies clusters or groupings of documents by content. The developer may then evaluate the clusters 6250. If the results of clustering are unsatisfactory, the developer can adjust the contents of the automatically generated clusters 6280 by merging or splitting clusters or moving documents from one cluster to another, using the category annotation interface of the development environment.

The resulting organization of documents helps not only to understand what kinds of content is found in a document collection, but also whether or not this information matters to the information extraction problem and should be used to guide or filter documents in the application. For example, a document set may contain documents that are irrelevant to the IE application and they should be ignored or filtered out. Similarly, a category of documents may require special processing and a document's category could be used to trigger this special processing. In addition, this process can be used to generate the document type models 2070 used by the engine to identify the document type to which an input document belongs.

Tuning the document structure models is a partially supervised process that the user invokes to analyze and create models of the structure of documents. Document structure can play a significant role in information extraction. For example, the developer may want to control information extraction by document genre or section or even to filter out certain document sections as irrelevant to information extraction.

Semantic exploration 3080 as describe above may then be performed. This is a process identifies semantic patterns which may be latent in the documents. Once semantic exploration 3080 is complete, the developer can use the instance view to perform a concordance-like exploration of terms, to identify and classify extraction targets, to create an extraction ontology, and to construct word, phrase, and gazetteer lists 2140 as shown initially in FIG. 2b. Semantic exploration can also be used for document classification and categorization.

These steps provide a great deal of information about a document collection that is otherwise very difficult to discern, and which helps the developer refine the definition of the extraction problem (FIG. 6b, no. 6260).

A developer may decide to perform these steps initially with a relatively small data set, say hundreds of documents, before collecting much larger sets of additional data. If a large document set is available, it may be imported in advance, but only small samples used for semantic exploration.

Referring now to FIG. 6c there is shown a typical flow of tuning a low-level linguistic analysis component.

The standard linguistic components consist of a set of data files, rules and classifiers for the structure analysis components and data-driven annotators, that perform certain basic linguistic analysis on input text, such as tokenization, low-level semantic annotation, part-of-speech tagging, phrase analysis, and so forth. The standard components that are included as part of the engine and development environment can be used directly in extraction applications, or as a means to bootstrap data used to develop components with similar functionality, that are better tuned to the developer's specific data and problem space. The standard linguistic components may include tokenization, low-level semantic annotation, part-of-speech tagging phrase analysis, clause analysis, normalization, de-duplication, and linguistic relation analysis.

Although it has been suggested that many natural language processing components work equally well no matter what domain they are applied to—and this is often the practice with both research and commercial IE applications—there is considerable experience to the contrary. The standard linguistic components may not be accurate enough for the particular information extraction task at hand. Although a developer should always consider using the standard linguistic components "as is" because they may be accurate enough to the task at hand, the developer must be able to tune, refine or redevelop these components if this is necessary to achieve the required accuracy.

Similarly, the developer may consider using generically developed components that perform higher-level analysis. Experience again suggests that the performance of these components—named entity extraction, time extraction, event extraction, relationship extraction, and de-duplication—is highly dependent on the domain and source documents.

Tuning the standard linguistic components takes place in several steps. The first is to review the performance of individual linguistic components, starting with the lowest level and moving higher and higher in the hierarchy. That means starting with tokenization, and moving in turn to low-level semantic annotation, part-of-speech tagging, phrase analysis, clause analysis, linguistic relation analysis, and de-duplication. To do this, a sample is selected from the larger document set.

A sample is processed by the component to create baseline output 6400. The developer may review the results using an instance view 6410. This allows the developer to see individual instances in context, as well as re-sort instances based on category, sort keys, and other kinds of context. If an inspection of the instances 6420 suggests that the process is defective, the developer can refine the process. In this instance, the developer must choose whether to tune the standard component (using its patterns, rules, or classifier model as a baseline, and incrementally improving it), or to replace it with a newly-developer standard component, or to replace it with a plug-in module 6440.

Whichever approach is chosen, the basic approach is the same: the component is tuned 6430 or developed 6450, output is generated over the test sample again, and this output is compared to the baseline in steps 6460A or 6460B respectively. If the output determined to be sufficiently improved in steps 6470 A and 6470B, respectively, then the process is complete for that component 2080 and/or 2110, respectively, and the developer may move on to other components.

If the approach is to tune or create an existing pattern or rule-based component, the developer may wish to modify the patterns and rules until the resulting output is satisfactory and differs from the original in predictable and appropriate ways. However, for processes that are at least in part classifier-based, the developer has more efficient methods to understand performance, since classifier results can be scored using standard performance metrics. Furthermore, the developer can use well-known machine-learning techniques to make annotation more efficient such as co-training and active learning (discussed below in more detail) to create a high-quality component. The final version of the development data may also be saved as a basis for later differencing views.

Referring now to FIG. 6*d*, there is shown a co-training process that can be used to annotate a large set of data in an unsupervised fashion, given a small seed set of hand-annotated exemplars. When a manual review/annotation step is added, the process turns into what is known as "active learning," which can be used to annotate a large body of data in a semi-supervised fashion. Either approach can be used to create evaluation data for components of engine applications, training data for classifier ensemble-based components, and classifier based models to be used in engine applications directly.

The choice between approaching any given annotation task with an unsupervised versus a semi-supervised process—or even a fully supervised hand-crafted process—depends on factors such as the nature of the annotation problem, the amount of data to be annotated, quality requirements for the data, the point in the development process, the potential ancillary benefits for the developer to be involved in manual review and annotation.

Both processes are embodied in workflows that are provided as standard components of the developer environment. These workflows can be used as they are supplied or modified by developers to create variations of the processes, using for example different numbers of classifiers to bootstrap the annotation; varying the features, algorithms, and algorithm parameters used; or changing the values of thresholds or the calculation of metrics used at various decision points in the process.

Whether the unsupervised or semi-supervised process is applied, it uses two or more different classifiers or ensembles of classifiers to bootstrap the annotation. The classifiers or classifier ensembles can differ from one another in various ways: the features they use to compute their models, the data they use to compute their models, the algorithms they use, the algorithm parameters, or some combination of these. Differences in the number of classifiers or ensembles used in the process, or in the way these are assembled, are all potential variations on the same basic process. For clarity, the diagram and description below describes the process in terms of two different classifiers, referred to as Classifier A and Classifier B.

A large pool of unannotated data is assembled 6600 and from this pool, a smaller sample training set of examples is selected and annotated manually 6610. Classifier A is trained with the training set 6620, then used to annotate the remainder of the unannotated data 6630.

Co-training takes place as follows: There are two pools of data: the "training" pool (which starts with only a few seeds) and the "possible" pool (typically much larger). Each classifier provides a set of examples it has classified after one round of training. Classifier A then evaluates the data in the possible pool. The top k best examples are selected in step 6640. These are removed from the possible pool, and added to the training pool. Classifier B is then trained on the augmented training pool, and then evaluates the (slightly smaller) possible pool. The results are inspected to find a set of the best examples. These examples are again removed from the possible pool, and added to the training pool. The process continues, training and evaluating with Classifier A and Classifier B alternately, as the training pool grows and the possible pool shrinks, until a stopping condition is met. The stopping condition can be based on a variety of criteria, such as the rate at which the system's performance improves, the number of cycles executed, or a threshold size for the training pool. At the point the stopping condition has been met, some approaches also transfer a large number of "good" candidates that both Classifier A and B have generated to the training pool, instead of just the relatively small number (k) from each turn.

When a semi-supervised process is used, the process proceeds as follows: The highest-confidence ("best") examples from the unannotated data, that were just annotated by Classifier A, are selected 6650. Various selection algorithms can be used. If a semi-supervised process is used, a manual review step is performed, whereby these examples are manually reviewed, and if necessary, any annotations assigned to them in error by classifier A are corrected 6660. Many active-learning approaches alternatively present a set of the least-reliably classified examples for manual review in order to identify and reduce the number of classification errors. These reviewed examples are then removed from the unannotated data, and put into the training data 6670.

Classifier B may be trained with the (now larger) set of training examples 6680 and used to annotate the (now smaller) set of unannotated data 6690. A subset of the examples processed by Classifier B may be manually reviewed. Now, the stopping condition can be tested, for example, by comparing the output of Classifier A in the previous cycle with that of Classifier B in the current one. Assuming that the stopping condition has not been met and the output is sufficiently different, then the selection of examples, the optional manual review, and the addition of the examples to the training data (and their removal from the unannotated data) are repeated, and the cycle begins again by training Classifier A.

At the point when the stopping condition is met (for example, the output of the current run is not significantly different from that of the previous run), the process terminates. The result of the process is a set of annotated training examples 6700. These can be used for evaluation, or to create new models for classifier ensembles 2230, by defining their parameters 6710 and training them 6720 with the bootstrapped training data.

Variations of unsupervised and semi-supervised machine-learning training workflows—and even entirely different workflows—may be developed using the workflow scripting capabilities of the development environment. This significantly reduces the time, effort and complexity of modifying existing workflows, implementing new workflows, and experimenting with novel workflows.

It will be apparent to one of skill in the art that described herein is a novel apparatus, system and method for information extraction software application development. While the invention has been described with reference to specific preferred embodiments, it is not limited to these embodiments. The invention may be modified or varied in many ways and such modifications and variations as would be obvious to one of skill in the art are within the scope and spirit of the invention and are included within the scope of the following claims.

What is claimed is:

1. A method for processing natural language text with an information extraction application having at least one processing component, the method comprising the steps of:
    executing the following steps in a run time engine pre-deployment thereof:
        gathering a set of input data, the set of data having a predetermined code associated therewith;
        normalizing the set of data into a predetermined format;
    in a development environment, executing the following steps:
        importing the normalized and formatted data into the development environment
        defining an information extraction problem;
        selecting at least one subset of a data from the input data for exploration and development of the first subset data based upon the information extraction problem;
        adjusting the at least one processing component to match the problem definition and at least one of the input and the first subset data;
        annotating at least one of the input data and the first subset data to include predetermined annotations corresponding at least one of the input data and the first subset data; and
        evaluating the resulting annotations to upon a predetermined accuracy threshold.

2. The method according to claim 1, further comprising the step of extracting a data set ftom the set of input text according to the predetermined code.

3. The method according to claim 2 further comprising the step of importing the extracted data set into the information extraction system.

4. The method according to claim 3, where the predetermined data including meta data about the text thereof.

5. The method according to claim 4, further comprising the step of exploring the selected documents.

6. The system according to claim 4 where the feedback system is in communication with the runtime engine in the first instance having a per-user copy of a satellite ensiemble in communication with the client components.

7. The method according to claim 5, further comprising the step of annotating with using tnanual and automatic methods.

8. The method according to claim 7, further comprising the step of defining annotations; for the information extraction problem.

9. The method according to claim 8, further comprising the step of selecting predetermided accuracy thresholds.

10. he method according to claim 9, further comprising the step of deploying the application.

11. The method according to claim 10, further comprising the step of collecting end-user feedback information from the information extraction application.

12. The method according to claim 11, where the step of collecting end user feedback information includes aggregating feedback information for all end users and all documents aggregating feedback information for a specified user and the specified user's documents and adapting the run time engine to increase the performance of the information extraction application.

13. An apparatus having a computer readable storage medium on which is embedded One or more computer programs, the one or more computer programs implementiig a method of processing natural language text, the one or more computer programs comprising a set of instructions for:
    exceuting the following steps in a run time engine pre-deployment thereof:
        gathering a set of input text data from an information extraction application, the text having a predetermined code associated therewith;
        extracting a data set from the set of input text according to the predetermined code;
        normalizing the extracted set of data to a predetermined format;
    in a development environment, executing the following steps:
        defining an information extraction problem
        collecting documents for exploration and development
        exploring the document collection
        adjusting processing components to match the problem definition and
        documents
        definition
        annotating the documents using manual and automatic methods
        evaluating the resulting annotations, and
        deploying the application,
    collecting end-user feedback information from the information application, and adapting the run time engine to increase the performance of the information application.

14. The apparatus according to claim 13 further comprising one or more computer programs programmed to aggregate feedback information for all end users and all documents.

15. The system according to claim 13 where the first logging component is in communication with a document management system.

16. The apparatus according to claim 14 further comprising one or more computer programs programmed to aggregate feedback information for a specified user and the specified user's documents.

17. A system for processing natural language text using at least one computer, the system Comprising
    a run time engine in a first instance, comprising a conversion module, data-driven and rule-based annotators, a set of standard components, ontologies, tokenizers, structure recolgnition components, and developer created processing scripts;
    a development environment element having a development management system, a document management system, a development executive component, at least one annotation interface, a document structure system, an ontology management system, a development scripting language interpreter, where the development scripting language interpreter implements a first set developer created processing scripts and workflows, and a semantic exploration component; and a feedback module with at least one client component in communication with the runtime engine in the first instance and a first logging component for collecting user feedback for all applications in communication with the development environment.

18. The system according to claim 17 where the structure recognition components comprise document type and structure models.

19. The system according to claim 17 where the run time engine further comprises a development created components module.

20. The system according to claim 17 where the development executive component comprises the runtime engine in a second instance.

21. The system according to claim 17 where the development environment further comprises a document clustering system.

22. The system according to claim 17 where the development environment further comprises a second logging component.

23. A method for constructing an information extraction application, the method comprising the steps of:
   defining an information extraction problem,
   collecting documents for exploration and development,
   exploring the document collection,
   adjusting processing components to match the problem definition and documents definition,
   annotating the documents using manual and automatic methods,
   evaluating the resulting annotations, and
   deploying the information extraction application.

* * * * *